US009928736B2

(12) United States Patent
Masutani et al.

(10) Patent No.: US 9,928,736 B2
(45) Date of Patent: Mar. 27, 2018

(54) METHOD OF COLLECTING PROBE INFORMATION, COMPUTER-READABLE RECORDING MEDIA AND TRAVEL TIME CALCULATION APPARATUS

(71) Applicants: ZENRIN Co., LTD., Kitakyushu-shi (JP); TOYOTA JIDOSHA KABUSHIKI KAISHA, Toyota-shi (JP); AISIN AW Co., LTD., Anjo-shi (JP)

(72) Inventors: Tomohiko Masutani, Kitakyushu (JP); Hiroyuki Tashiro, Kitakyushu (JP); Yoichi Mori, Kitakyushu (JP); Motohiro Nakamura, Okazaki (JP); Tomoki Kodan, Nagoya (JP); Atsushi Ikeno, Minato-ku (JP); Yoshitaka Kato, Minato-ku (JP); Sadahiro Koshiba, Takahama (JP); Kazuteru Maekawa, Miyoshi (JP)

(73) Assignees: ZENRIN CO., LTD., Kitakyushu-shi (JP); TOYOTA JIDOSHA KABUSHIKI KAISHA, Toyota-shi (JP); AISIN AW CO., LTD., Anjo-shi (JP)

(*) Notice: Subject to any disclaimer, the term of this patent is extended or adjusted under 35 U.S.C. 154(b) by 0 days.

(21) Appl. No.: 15/122,465

(22) PCT Filed: Feb. 20, 2015

(86) PCT No.: PCT/JP2015/000823
§ 371 (c)(1),
(2) Date: Aug. 30, 2016

(87) PCT Pub. No.: WO2015/133079
PCT Pub. Date: Sep. 11, 2015

(65) Prior Publication Data
US 2017/0069200 A1    Mar. 9, 2017

(30) Foreign Application Priority Data

Mar. 3, 2014    (JP) .................................. 2014-040552

(51) Int. Cl.
*G08G 1/01*    (2006.01)
*H04L 29/08*    (2006.01)
*H04L 29/06*    (2006.01)

(52) U.S. Cl.
CPC ......... *G08G 1/0141* (2013.01); *G08G 1/0112* (2013.01); *G08G 1/0129* (2013.01);
(Continued)

(58) Field of Classification Search
CPC .. G08G 1/0104; G08G 1/0141; G08G 1/0112; G08G 1/0129; G08G 1/0133;
(Continued)

(56) References Cited

U.S. PATENT DOCUMENTS 6,125,323 A * 9/2000 Nimura .................. G01C 21/30
340/988
6,211,798 B1 * 4/2001 Albrecht ............ G01C 21/3415
340/988
(Continued)

FOREIGN PATENT DOCUMENTS

JP    2007-207083 A    8/2007
JP    2007-248183 A    9/2007
(Continued)

OTHER PUBLICATIONS

International Search Report dated May 19, 2015 in PCT/JP2015/000823 filed Feb. 20, 2015.

*Primary Examiner* — Hung T Nguyen
(74) *Attorney, Agent, or Firm* — Oblon, McClelland, Maier & Neustadt, L.L.P.

(57) ABSTRACT

There is provided a method of collecting probe information generated during travel of a vehicle, comprising: (a) receiv-
(Continued)

ing probe information including travel time information of a reference area, from a vehicle traveling a reference area that includes at least one of an intersection area that is an area from an approach to an intersection to an exit from the intersection and a road area that connects with the intersection area and is an area from the exit of the intersection to an approach of another intersection adjacent to the intersection in an exit direction; and (b) storing the received probe information.

17 Claims, 23 Drawing Sheets

(52) U.S. Cl.
CPC ....... *G08G 1/0133* (2013.01); *H04L 67/1097* (2013.01); *H04L 67/12* (2013.01); *H04L 67/42* (2013.01)

(58) Field of Classification Search
CPC ..... G08G 1/123; H04L 67/1097; H04L 67/12; H04L 67/42
USPC .... 340/988, 995.13; 701/117, 208, 300, 301
See application file for complete search history.

(56) References Cited

U.S. PATENT DOCUMENTS

| 2007/0106460 A1* | 5/2007 | Nakayama ......... G01C 21/3655 701/533 |
| 2011/0276257 A1* | 11/2011 | Zaitsu .................. G08G 1/0104 701/117 |
| 2013/0006508 A1 | 1/2013 | Li et al. |

FOREIGN PATENT DOCUMENTS

| JP | 2009-252066 A | 10/2009 |
| JP | 2010-236996 A | 10/2010 |
| JP | 2012-3344 A | 1/2012 |
| JP | 2012-43271 A | 3/2012 |

* cited by examiner

ROAD NETWORK DN

POLYGON DATA PD

Fig.5

DATA STRUCTURE OF PROBE INFORMATION A1

| HEADER | VEHICLE ID | APPROACH ID | TARGET ID | EXIT ID | TRAVEL TIME INFORMATION (minute) | APPROACH TIME INFORMATION |
|---|---|---|---|---|---|---|
| F1 | G1 | P2 | D3 | P3 | 20 | A (hour), B (minute), C (month), D (date), 201X (year) |

SECTION INFORMATION Gi

Fig.6

STATISTICAL INFORMATION 67

| APPROACH ID : P2 |  |
|---|---|
| TARGET ID : D3 |  |
| EXIT ID : P3 |  |

SECTION INFORMATION Gi

| TRAVEL TIME (minute) | PROBABILITY (%) |
|---|---|
| 0 | 0 |
| 5 | 2 |
| 10 | 5 |
| 15 | 15 |
| 20 | 35 |
| 25 | 20 |
| 30 | 15 |
| 35 | 5 |
| 40 | 3 |
| 45 | 0 |
| AVERAGE COST : ○○ | |

HISTOGRAM DATA

TRAVEL TIME STATISTICAL INFORMATION Gp

ROAD TYPE: NATIONAL ROAD
⋮

ADDITIONAL INFORMATION Gt

POLYGON DATA PDa

Fig.9

DATA STRUCTURE OF PROBE INFORMATION A1b

| HEADER | VEHICLE ID | APPROACH ID | TARGET ID | EXIT ID | TRAVEL TIME INFORMATION (minute) | APPROACH TIME INFORMATION |
|---|---|---|---|---|---|---|
| F1b | G2 | D13 (P10,2) | D3 | D4 | 20 | A (hour), B (minute), C (month), D (date), 201X (year) |
| F2b | G3 | D2 (P1,2) | D3 | D4 | 30 | E (hour), F (minute), G (month), H (date), 201X (year) |
| F3b | G4 | D12 (P12,2) | D3 | D4 | 20 | I (hour), J (minute), K (month), L (date), 201X (year) |

SECTION INFORMATION Gib

FIRST APPROACH POINT
SECOND APPROACH POINT
APPROACH ID

Fig.10

STATISTICAL INFORMATION 67b

| APPROACH ID : D2 |  |
|---|---|
| TARGET ID : D3 |  |
| EXIT ID : D4 |  |
| TRAVEL TIME (minute) | PROBABILITY (%) |
| 0 | 0 |
| 5 | 2 |
| 10 | 5 |
| 15 | 15 |
| 20 | 35 |
| 25 | 20 |
| 30 | 15 |
| 35 | 5 |
| 40 | 3 |
| 45 | 0 |
| AVERAGE COST : ○○ |  |
| ROAD TYPE: NATIONAL ROAD ⋮ |  |

SECTION INFORMATION Gib

HISTOGRAM DATA

TRAVEL TIME STATISTICAL INFORMATION Gp

ADDITIONAL INFORMATION Gt

POLYGON DATA PD

DATA STRUCTURE OF PROBE INFORMATION A1b

| HEADER | VEHICLE ID | APPROACH ID | TARGET ID | EXIT ID | TRAVEL TIME INFORMATION (minute) | APPROACH TIME INFORMATION |
|---|---|---|---|---|---|---|
| F1c | G1c | D2 | D3 | D4 | 20 | A (hour), B (minute), C (month), D (date), 201X (year) |
| F2c | G2c | D2 | D3 | D5 | 30 | E (hour), F (minute), G (month), H (date), 201X (year) |

SECTION INFORMATION Gib (spanning APPROACH ID, TARGET ID, EXIT ID)

POLYGON DATA PDd

DATA STRUCTURE OF PROBE INFORMATION A1b OF STARTING POINT REGION Lna

| HEADER | VEHICLE ID | APPROACH ID | TARGET ID | EXIT ID | TRAVEL TIME INFORMATION (minute) | APPROACH TIME INFORMATION |
|---|---|---|---|---|---|---|
| F10 | G10 | D80 | D62 | D64 | 30 | A (hour), B (minute), C (month), D (date), 201X (year) |
| F11 | G11 | D60 | D62 | D64 | 15 | E (hour), F (minute), G (month), H (date), 201X (year) |
| F12 | G12 | D82 | D62 | D64 | 20 | I (hour), J (minute), K (month), L (date), 201X (year) |

Fig.20

DATA STRUCTURE OF PROBE INFORMATION A1b OF INTERMEDIATE REGION Lnc

| HEADER | VEHICLE ID | APPROACH ID | TARGET ID | EXIT ID | TRAVEL TIME INFORMATION (minute) | APPROACH TIME INFORMATION |
|---|---|---|---|---|---|---|
| F21 | G11 | D62 | D64 | D66 | 10 | 14:10, August 8, 2013 |
| F22 | G11 | D64 | D66 | D68 | 8 | 14:20, August 8, 2013 |
| F23 | G11 | D66 | D68 | D70 | 10 | 14:28, August 8, 2013 |
| F24 | G11 | D68 | D70 | D72 | 5 | 14:38, August 8, 2013 |

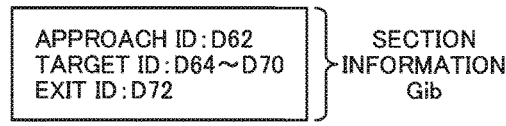

APPROACH ID: D62
TARGET ID: D64~D70
EXIT ID: D72
} SECTION INFORMATION Gib

Fig.21

DATA STRUCTURE OF PROBE INFORMATION A1b OF END POINT REGION Lnb

| HEADER | VEHICLE ID | APPROACH ID | TARGET ID | EXIT ID | TRAVEL TIME INFORMATION (minute) | APPROACH TIME INFORMATION |
|---|---|---|---|---|---|---|
| F30 | G10 | D70 | D72 | D104 | 25 | A (hour), B (minute), C (month), D (date), 201X (year) |
| F31 | G11 | D70 | D72 | D74 | 10 | E (hour), F (minute), G (month), H (date), 201X (year) |
| F32 | G12 | D70 | D72 | D106 | 15 | I (hour), J (minute), K (month), L (date), 201X (year) |

Fig.22

STATISTICAL INFORMATION 67f

| APPROACH ID : D60 |  |
|---|---|
| TARGET ID : D62~D70 |  |
| EXIT ID : D64 |  |

} SECTION INFORMATION Gif

| TRAVEL TIME (minute) | PROBABILITY (%) |
|---|---|
| 0 | 0 |
| 10 | 0 |
| ⋮ | ⋮ |
| 50 | 20 |
| ⋮ | ⋮ |

} TRAVEL TIME STATISTICAL INFORMATION Gp

| AVERAGE COST : ○○ |
|---|
| ROAD TYPE: NATIONAL ROAD |

} ADDITIONAL INFORMATION Gt

TRAVELING DIRECTION

Fig.28

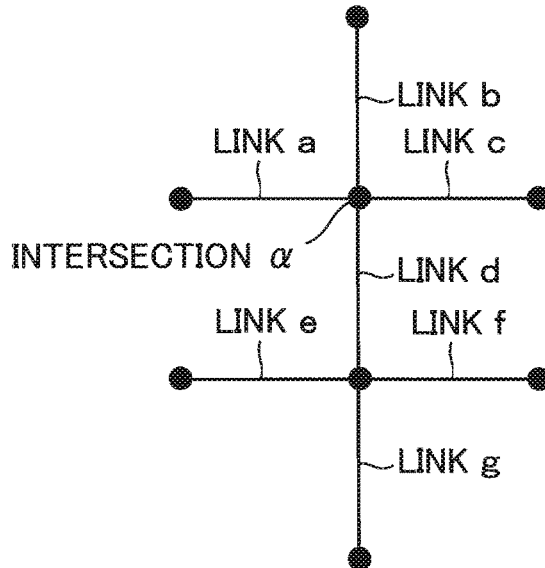

Fig.29

| APPROACH LINK ID | e |
|---|---|
| TARGET LINK ID | d |
| EXIT LINK ID | a |
| ROAD PASSING COST | 4 |

| APPROACH LINK ID | e |
|---|---|
| TARGET LINK ID | d |
| EXIT LINK ID | b |
| ROAD PASSING COST | 3 |

| APPROACH LINK ID | e |
|---|---|
| TARGET LINK ID | d |
| EXIT LINK ID | c |
| ROAD PASSING COST | 6 |

| APPROACH LINK ID | g |
|---|---|
| TARGET LINK ID | d |
| EXIT LINK ID | a |
| ROAD PASSING COST | 3 |

| APPROACH LINK ID | g |
|---|---|
| TARGET LINK ID | d |
| EXIT LINK ID | b |
| ROAD PASSING COST | 2 |

| APPROACH LINK ID | g |
|---|---|
| TARGET LINK ID | d |
| EXIT LINK ID | c |
| ROAD PASSING COST | 5 |

| APPROACH LINK ID | f |
|---|---|
| TARGET LINK ID | d |
| EXIT LINK ID | a |
| ROAD PASSING COST | 6 |

| APPROACH LINK ID | f |
|---|---|
| TARGET LINK ID | d |
| EXIT LINK ID | b |
| ROAD PASSING COST | 5 |

| APPROACH LINK ID | f |
|---|---|
| TARGET LINK ID | d |
| EXIT LINK ID | c |
| ROAD PASSING COST | 10 |

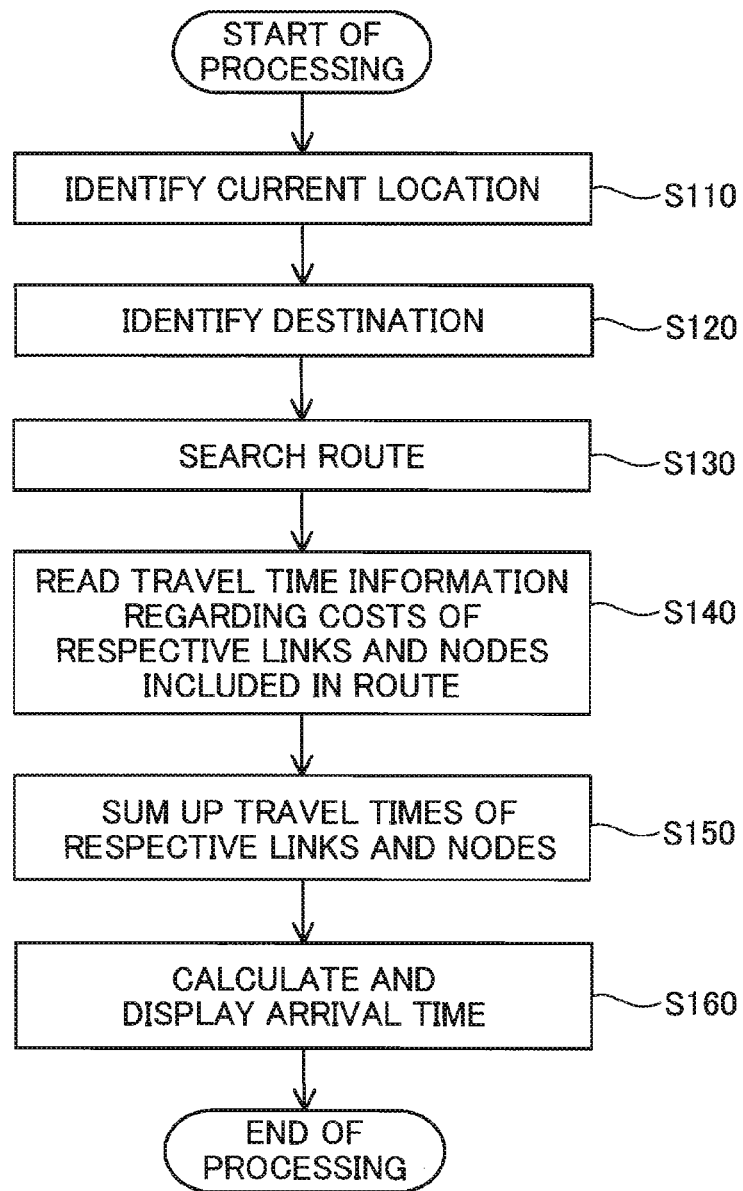

METHOD OF COLLECTING PROBE INFORMATION, COMPUTER-READABLE RECORDING MEDIA AND TRAVEL TIME CALCULATION APPARATUS

CROSS-REFERENCE TO RELATED APPLICATIONS

The present application claims priority from Japanese patent application P2014-40552 filed on Mar. 3, 2014, the content of which is hereby incorporated by reference into this application.

TECHNICAL FIELD

The present invention relates to a technique of collecting probe information of a road network.

BACKGROUND ART

There is a known technique to travel vehicles called probe vehicles, collect probe information of each predetermined section (link) that includes travel time information of the predetermined section, and analyze the probe information, so as to inform the user of a traffic event in a road network or to use the probe information for a route search (for example, JP 2007-207083A).

SUMMARY

Technical Problem

The technique disclosed in JP 2007-207083A uses road network data that represents a road network by nodes representing, for example, intersections and junctions of roads and links interconnecting the nodes, and collects probe information with regard to each link, from the probe information passing through the link.

A node in the road network data is generally set in the vicinity of the center of an intersection area, so that the travel time between adjacent nodes (link) is the driving time of the probe vehicle that runs from the vicinity of the center of an intersection to the vicinity of the center of a next intersection in the traveling direction.

When travel time statistics are computed by collecting probe information with regard to each link, however, the technique of collecting probe information including travel time information with regard to each link may fail to accurate express the actual travel time of the vehicle that runs through the link. For example, stop lines such as stop lines and pedestrian crossings may be provided at an intersection or on its peripheral roads. In a place of left-hand traffic, the vehicle may have a waiting time for the oncoming vehicles when turning right at an intersection and have a waiting time for pedestrians walking on a pedestrian crossing. There may thus be a significant difference in time required for passing through an intersection between the vehicles turning right at the intersection and the vehicles going straight through the intersection. When the traffic of a probe vehicle is delayed at an intersection, it is difficult to accurately express the driving time of the probe vehicle that runs through the actual road as the travel time information without determining to which of the links connecting with a node representing the intersection the travel information including the delayed time information is to be connected. For example, it is assumed that the probe vehicle comes from a first link, turns right at a node and goes to a second link. When the traffic of the probe vehicle is delayed at an intersection represented by the node, the time period required for a right turn from the first link may be included in the time period required for running through the second link by map matching. This problem is not limited to the travel time of the vehicle in the place of left-hand traffic but may similarly occur with regard to the travel time of the vehicle in the place of right-hand traffic. Other needs over the prior art include, for example, improvement of the processing efficiency, downsizing of the apparatus, cost reduction, resource saving and improvement of the convenience.

Solution to Problem

In order to solve the problems described above, the invention may be implemented by aspects or applications described below.

(1) According to one aspect of the invention, there is provided a method of collecting probe information generated during travel of a vehicle. This method of collecting may comprise (a) receiving probe information including travel time information of a reference area, from a vehicle traveling the reference area that includes at least one of an intersection area that is an area from an approach to an intersection to an exit from the intersection and a road area that connects with the intersection area and is an area from the exit of the intersection to an approach of another intersection adjacent to the intersection in an exit direction; and (b) storing the received probe information. The method of collecting according to this aspect collects probe information of the reference area of the fixed range. Even when the traffic of vehicles is delayed at an intersection, this configuration allows for collection of probe information with connecting the delayed time with the reference area and thereby ensures generation of statistics of accurate travel time information.

(2) In the method of collecting according to the above aspect, the reference area may include both the intersection area and the road area that connects with the intersection area. The method of collecting according to this aspect allows for collection of the probe information of the reference area that includes the delayed time when the traffic of vehicles is delayed at the intersection. This enables the reference area to be connected with the location where the traffic is delayed (intersection). This ensures generation of statistics of accurate travel time information.

(3) In the method of collecting according to the above aspect, the (a) may separately receive the probe information of the intersection area that is the reference area and the probe information of the road area that is the reference area. The method of collecting according to this aspect accurately generates the cost of the road area based on the probe information when the collected probe information is used to search a route from a place of departure to a destination. This configuration accordingly enables a travel time from the place of departure to the destination to be calculated with high accuracy. Especially when the destination is located in the middle of the road area, specifying the intersection area and the road area as different reference areas enables the travel time to the destination to be calculated with high accuracy.

(4) In the method of collecting according to the above aspect, the probe information may be generated with regard to each approach direction to the reference area. The method of collecting according to this aspect receives the probe information of the reference area with regard to each approach direction and thereby enables the travel time information of the reference area to be generated with regard to each approach direction. Even when there is a difference in travel time between different approach directions to the reference area, this configuration enables statistics of the travel time information to be generated with the higher accuracy with regard to the reference area.

(5) In the method of collecting according to the above aspect, the probe information may be generated with regard to each exit direction from the reference area. The method of collecting according to this aspect receives the probe information of the reference area with regard to each exit direction and thereby enables the travel time information of the reference area to be generated with regard to each exit direction. Even when there is a difference in travel time between different exit directions from the reference area, this configuration enables statistics of the travel time information to be generated with the higher accuracy with regard to the reference area.

(6) The method of collecting according to the above aspect may further comprise (c) generating statistical information that indicates a histogram of a travel time in the reference area, based on the stored probe information. The (c) may comprise (c1) dividing an area set including at least three reference areas into (i) a starting point region that includes a starting point of the area set and is comprised of at least one reference area; (ii) an end point region that includes an end point of the area set and is comprised of at least one reference area; and (iii) an intermediate region that is included in the area set; (c2) generating the statistical information of the starting point region, based on the probe information of the starting point region received from a vehicle that passes through the entire reference area constituting the starting point region at a time; (c3) generating the statistical information of the end point region, based on the probe information of the end point region received from a vehicle that passes through the entire reference area constituting the end point region at a time; (c4) generating the statistical information of the intermediate region, based on the probe information of the intermediate region received from a vehicle that passes through the entire reference area constituting the intermediate region at a time; and (c5) generating the statistical information of the area set by a convolution operation of pieces of information regarding the travel time that respectively include the statistical information of the starting point region, the statistical information of the intermediate region and the statistical information of the end point region. The method of collecting according to this aspect enables the statistical information of the area set to be generated with high accuracy.

The invention may be implemented by various aspects, for example, a collection apparatus of probe information, an apparatus for analyzing collected probe information, an apparatus for generating travel time statistical information using probe information, a system for collecting probe information, a computer program or data configured to implement any of the apparatus, the method or the system, and a non-transitory physical recording medium in which the computer program or data is recorded, in addition to the method of collecting probe information.

BRIEF DESCRIPTION OF DRAWINGS

FIG. 5 is a diagram showing the data structure of probe information generated by the information generation device;

FIG. 6 is a diagram showing the data structure of statistical information;

FIG. 9 is a diagram showing the data structure of probe information generated by the information generation device;

FIG. 10 is a diagram showing the data structure of statistical information generated by a server according to the third embodiment;

FIG. 20 is a diagram showing the data structure of probe information of an intermediate region and section information included in statistical information;

FIG. 21 is a diagram showing one example of the data structure of probe information of an end point region;

FIG. 22 is a diagram showing the data structure of statistical information generated at step S46 shown in FIG. 18;

FIG. 28 is a diagram illustrating a relationship between intersection areas and road areas;

FIG. 29 is a diagram showing one example of the data structure of map information data;

FIG. 30 is a diagram showing one example of the data structure of map information data; and FIG. 31 is a chart showing a process flow for calculating a travel time.

DESCRIPTION OF EMBODIMENTS

A. First Embodiment

Figure 1:
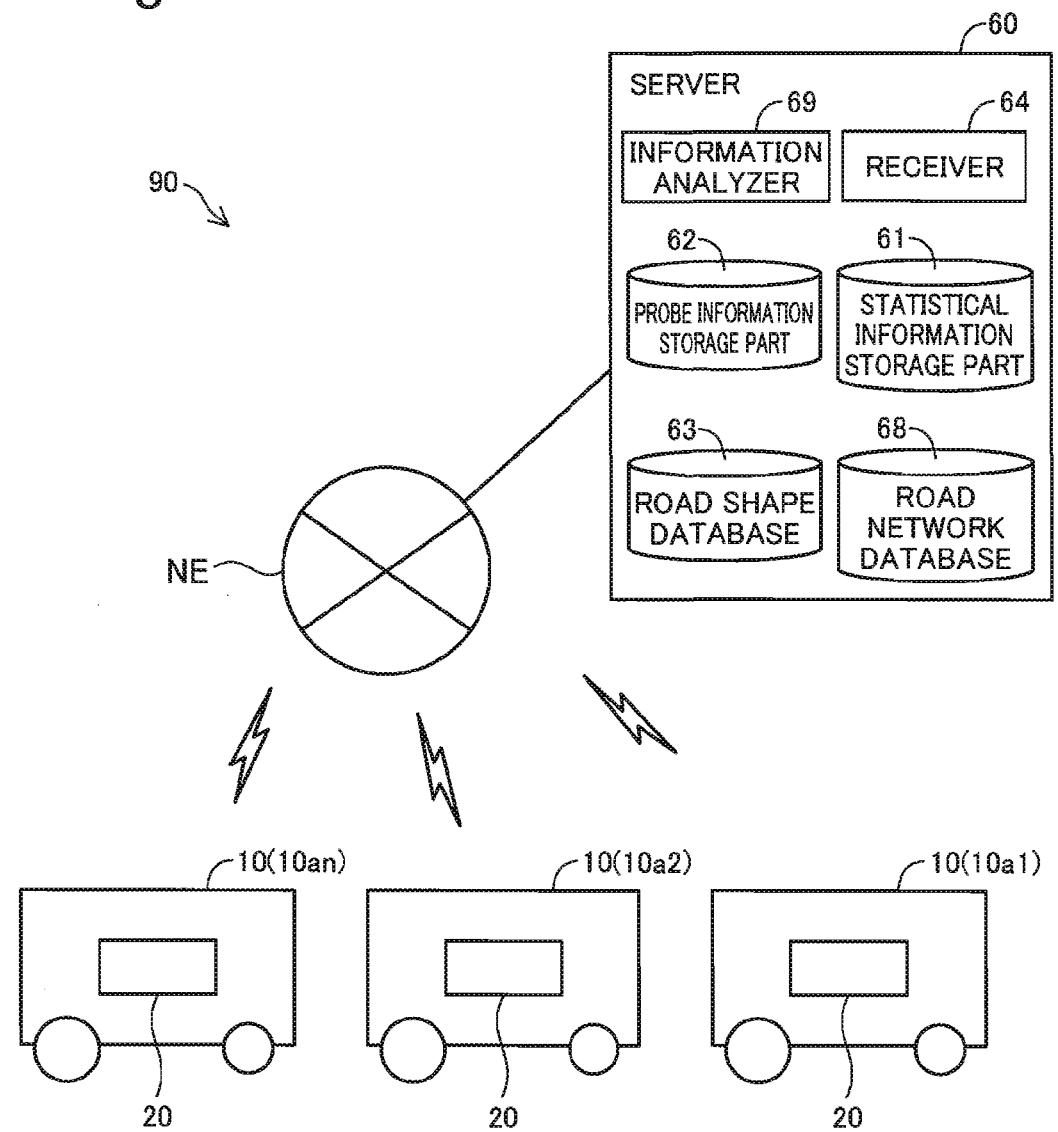
FIG. 1 is a diagram illustrating the configuration of a probe information collecting system according to a first embodiment.

FIG. 1 is a diagram illustrating the configuration of a probe information collecting system (hereinafter may be simply referred to as "collecting system") 90 according to a first embodiment of the invention. The collecting system 90 includes n probe vehicles 10a1 to 10an and a server 60 configured to receive probe information A1 sent from these probe vehicles 10a1 to 10an in the form of packets. In the description of the embodiment, when there is no need to discriminate among the respective probe vehicles 10a1 to 10an, these probe vehicles 10a1 to 10an are collectively called probe vehicle 10. The probe vehicle 10 includes an information generation device 20 configured to generate probe information A1 and send the generated probe information A1 to the server 60 via a wireless communication network NE. The details of the information generation device 20 will be described later.

The server 60 includes a receiver 64, an information analyzer 69, a probe information storage part 62, a statistical information storage part 61, a road shape database 63, and a road network database 68. The receiver 64 receives the probe information A1 sent from the probe vehicle 10. The probe information storage part 62 stores the probe information A1 sent from the probe vehicle 10. The information analyzer 69 analyzes the probe information A1 stored in the probe information storage part 62, generates statistical information including travel time data in a predetermined area, and stores the generated statistical information into the statistical information storage part 61. The road network database 68 is a database configured to store road network data corresponding to an actual road network. The road network data stores link data, node data and traffic regulation information at each intersection (for example, no U-turn, no right-turn, no left-turn, or no entry). The node data is data indicating a road junction, a fork in a road, or an end point (for example, an intersection or a dead end) on the map. The link data is data indicating each road on the map and is related to nodes representing a starting point and an end point of the road. The traffic regulation information is related to the node data.

The road shape database 63 stores road shape data including polygon data indicating the shapes of roads and intersections. The road shape database 63 and the road network database 68 are correlated to each other. The details of the road shape data will be described later. The statistical information storage part 61 stores statistical information including travel time data in each predetermined area expressed by polygon data. The server 60 integrates a cost of each route by taking into account the statistical information stored in the statistical information storage part 61 in the process of a route search from the place of departure to the destination.

Figure 2:
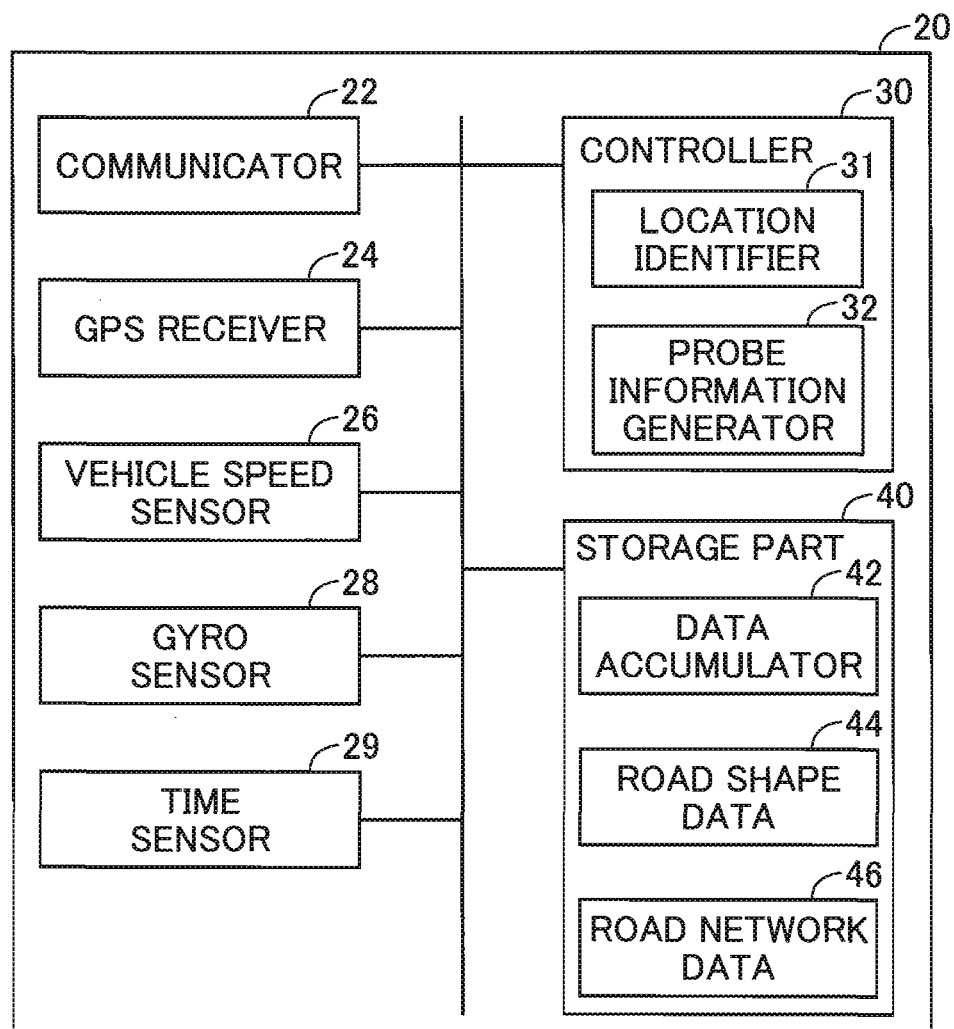
FIG. 2 is an internal block diagram illustrating an information generation device.

FIG. 2 is an internal block diagram illustrating the information generation device 20 mounted on the probe vehicle 10. The information generation device 20 includes a communicator 22, a GPS receiver 24, a vehicle speed sensor 26, a gyro sensor 28, a time sensor 29, a controller 30 and a storage part 40. The communicator 22 makes data communication including transmission of the probe information A1. The GPS receiver 24 receives radio waves from GPS (Global Positioning System) satellites. The vehicle speed sensor 26 detects the speed of the probe vehicle 10. The gyro sensor 28 detects the angle and the angular velocity of the probe vehicle 10. The time sensor 29 detects the current time.

The controller 30 includes a location identifier 31 and a probe information generator 32. The location identifier 31 identifies the location of the probe vehicle 10 by taking advantage of estimation of the location of the probe vehicle 10 based on the arrival times of the radio waves sent from the GPS satellites and autonomous navigation that accumulates changes of the location according to the vehicle speed detected by the vehicle speed sensor 26 and the traveling direction detected by the gyro sensor 28. The storage part 40 includes a data accumulator 42, road shape data 44 and road network data 46. The probe information generator 32 generates the probe information A1, based on the data 44 and 46 stored in the storage part 40 and various information including the current location of the probe vehicle 10. The data accumulator 42 accumulates the probe information A1 generated by the probe information generator 32. The communicator 22 sends the probe information A1 accumulated in the data accumulator 42 to the server 30 at predetermined time intervals. The information generation device 20 may be configured not to accumulate the probe information A1 in the data accumulator 42 but to send the probe information A1 to the server 60 every time the probe information A1 is generated by the probe information generator 32. The road shape data 44 is similar to the road shape database 63 stored in the server 60 and stores polygon data indicating the shapes of roads and intersections. The road network data 46 is similar to the road network data 46 stored in the server 60 and is a database that stores link data, node data and traffic regulation information at each intersection (for example, no U-turn, no right-turn, no left-turn, or no entry). The road shape data 44 and the road network data 46 are correlated to each other.

Figure 3:
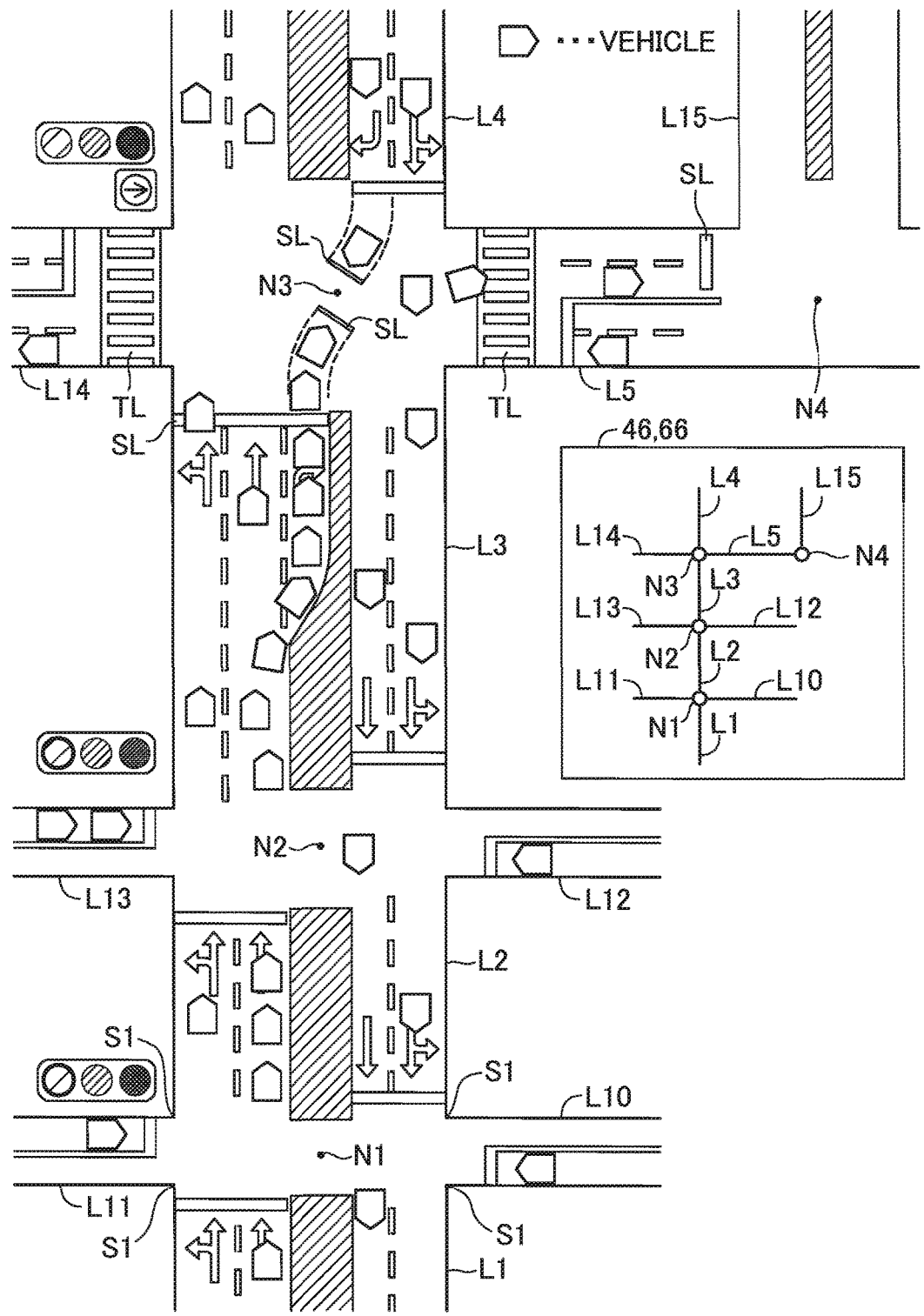
FIG. 3 is a diagram illustrating road network data corresponding to a road network in a predetermined area.

FIG. 3 is a diagram illustrating the road network data 46 corresponding to an actual road network DN in a predetermined area. FIG. 3 illustrates the structure of the corresponding road network data 46 in a box, in addition to the road network DN in the predetermined area. The road network DN includes roads expressed by links L1 to L5 and L10 to L15 and intersections expressed by nodes N1 to N4. For example, stop lines where the vehicles are to be stopped, for example, stop lines SL and pedestrian crossings TL are provided at an intersection expressed by the node N3 and its periphery. For example, a vehicle that runs on the link L3, turns right at the node N3 and enters the link L5 is expected to stop at the stop line SL or before the pedestrian crossing TL. This is likely to cause a congestion of vehicles at the intersection expressed by the node N3. In the road network data 46, it is not definitely determinable whether the occurrence of a traffic congestion at the intersection expressed by the node N3 is to be connected with travel time information of either of the link L3 and the link L5. If the travel time affected by the occurrence of a traffic congestion is connected with the link L5, the travel time affected by the occurrence of a traffic congestion is added even in the case of calculating the travel time of a vehicle that goes straight from the link L14 and enters the link L5. This is likely to cause a problem that fails to accurately estimate the travel time of a vehicle that runs in the actual road network DN.

Figure 4:
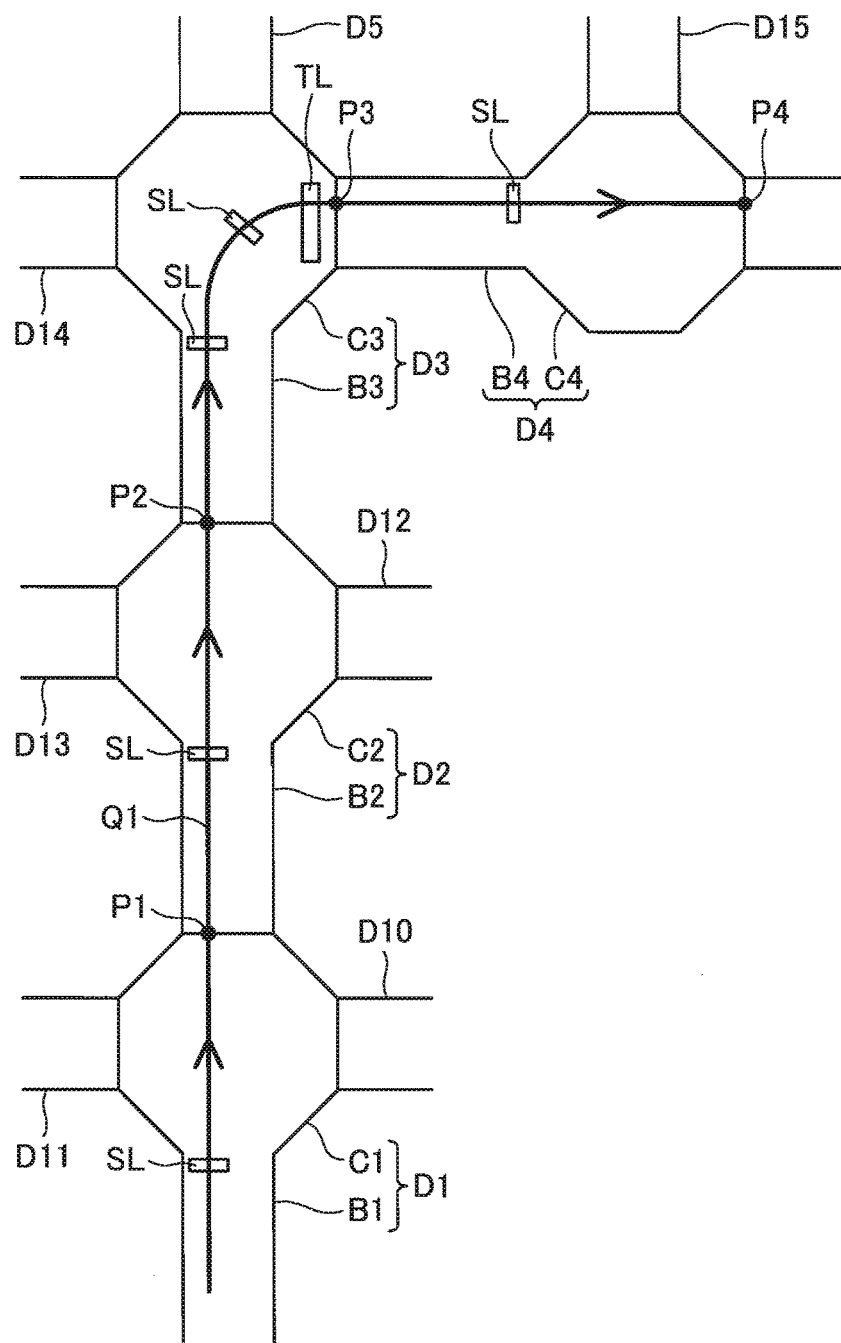
FIG. 4 is a diagram illustrating one example of polygon data stored in road shape data.

FIG. 4 is a diagram illustrating one example of polygon data PD stored in the road shape data 44. The polygon data PD of FIG. 4 corresponds to the road network DN shown in FIG. 3. The polygon data PD includes polygons representing a plurality of reference areas D1 to D5 and D10 to D15. The polygons represent the simplified shape of the actual road network DN according to this embodiment but may have shape corresponding to the shape of the actual road network DN. The reference area is a minimum unit for generating probe information. According to this embodiment, the reference area includes one intersection area (area from an approach to an intersection to an exit from the intersection) and one road area connecting with the intersection area (area from an exit of another intersection before this intersection area to the approach of this intersection area). The approach of an intersection area is, for example, a region where a stop line before the intersection in the traveling direction is located. The exit of the intersection area is, for example, a region before a pedestrian crossing in the exit direction of the intersection. An intersection area may be a road region that is surrounded by lines, each connecting a start point S1 in a region where two or more roads cross each other with a point of contact on a vertical line drawn from the start point S1 to an edge line on the opposite side across the road. A locus Q1 in the drawing represents the running path of the vehicle and indicates that the vehicle sequentially runs through the reference areas D1, D2, D3 and D4. The polygon data PD includes polygons representing the stop lines SL and TL provided on the road. The polygon data PD additionally includes data representing boundary lines P1 to P4 (boundary data P) that show the boundaries of the respective reference areas D1 to D5 and D10 to D15. The boundary line P1 between the reference areas D1 and D2, the boundary line P2 between the reference areas D2 and D3 and the boundary line P3 between the reference areas D3 and D4 are illustrated in the drawing. Among the plurality of reference areas D1 to D5 and D10 to D15, the reference areas D1 to D4 include intersection areas C1 to C4 including stop areas where the vehicle is to be stopped in road traffic, and road areas B1 to B4 connecting with the intersection areas C1 to C4. In the illustrated example of FIG. 4, the stop area where the vehicle is to be stopped includes a stop line such as a stop line SL or a pedestrian crossing TL provided at an intersection or on a road adjacent to the intersection. In another example, when a stop line is provided on a road adjacent to an intersection, an area before the stop line may be specified as the stop area where the vehicle is to be stopped. In the description herein, when there is no need to discriminate among the respective reference areas, these reference areas are collectively called "reference area D". When there is no need to discriminate among the respective intersection areas, these intersection areas are collectively called "intersection area C". When there is no need to discriminate among the respective road areas, these road areas are collectively called "road area B".

FIG. 5 is a diagram showing the data structure of the probe information A1 generated by the information generation device 20. The upper fields show the data types of the probe information A1, and the lower fields show a concrete example of the probe information A1. The probe information A1 includes a header, a vehicle ID, section information Gi, travel time information and approach time information. The header is unique information used to identify the generated probe information A1. The vehicle ID is unique information used to identify the probe vehicle 10 equipped with the information generation device 20. The section information Gi includes an approach ID, a target ID and an exit ID. The target ID indicates a reference area D that is an object for which travel time information is to be generated. The approach ID is information showing from which direction the probe vehicle 10 enters the target ID and is defined by the boundary data P. The travel time information indicates a travel time taken when the probe vehicle 10 runs through the reference area D expressed by the target ID. The approach time information indicates the time when the probe vehicle 10 enters the target ID. The approach time is specified by the time when the probe vehicle 10 passes through a boundary line of an adjacent reference area D. In the example shown in the lower fields of FIG. 5, the probe information A1 having a header F1 is generated by the information generation device 20 mounted on the probe vehicle 10 having the vehicle ID "G1". In the example shown in the lower fields of FIG. 5, the travel time in a reference area D3 of the probe vehicle 10 that runs from a reference area D2 through the reference area D3 to a reference area D4 is 20 minutes, and the time when the probe vehicle 10 enters the reference area D3 is "A (hour), B (minute), C (month), D (date), 201X (year)". The probe information A1 may include additional information, for example, information regarding the type of the road of the target ID (for example, national road or prefectural road) or climate information at the approach time, in addition to the above information. The probe information A1 may include information that allows the travel time of the target ID to be calculated by the information analyzer 69 of the server 60 (shown in FIG. 1), instead of the travel time information. For example, the probe information A1 may include exit time information indicating the time when the probe vehicle 10 exits the target ID, in addition to the approach time information.

FIG. 6 is a diagram showing the data structure of statistical information 67 stored in the statistical information storage part 61. The statistical information 67 includes section information Gi, travel time statistical information Gp and additional information Gt. The section information Gi is data similar to the section information Gi of the probe information A1 (shown in FIG. 5) and includes an approach ID, a target ID and an exit ID. The travel time statistical information Gp indicates statistics of the travel time with regard to the section information Gi. More specifically, the travel time statistical information Gp includes histogram data showing the probability of each travel time in the target ID and an average cost indicating an average travel time that is calculated from the histogram data by the information analyzer 69. The travel time statistical information Gp is generated by the information analyzer 69, based on a multiple pieces of the probe information A1 accumulated in the probe information storage part 62. The additional information Gt stores additional information, for example, the road type of the target ID.

As described above, in the collecting system 90, the information generation device 20 generates the probe information A1 with regard to one reference area D including an intersection area C and a road area B as a unit, and the server 60 receives the probe information A1 and generates the travel time statistical information Gp with regard to one reference area D as a unit. Even when the traffic of vehicles is delayed at an intersection, this configuration allows for collection of probe information with connecting the delayed time with the intersection area and thereby ensures generation of accurate travel time statistical information. The section information Gi includes the approach ID and the exit ID, in addition to the target ID. The travel time in the target ID can thus be generated with regard to each approach ID and each exit ID. This configuration enables data indicating the travel time of the target ID (for example, average cost) to be generated with the higher accuracy.

B. Second Embodiment

Figure 7:
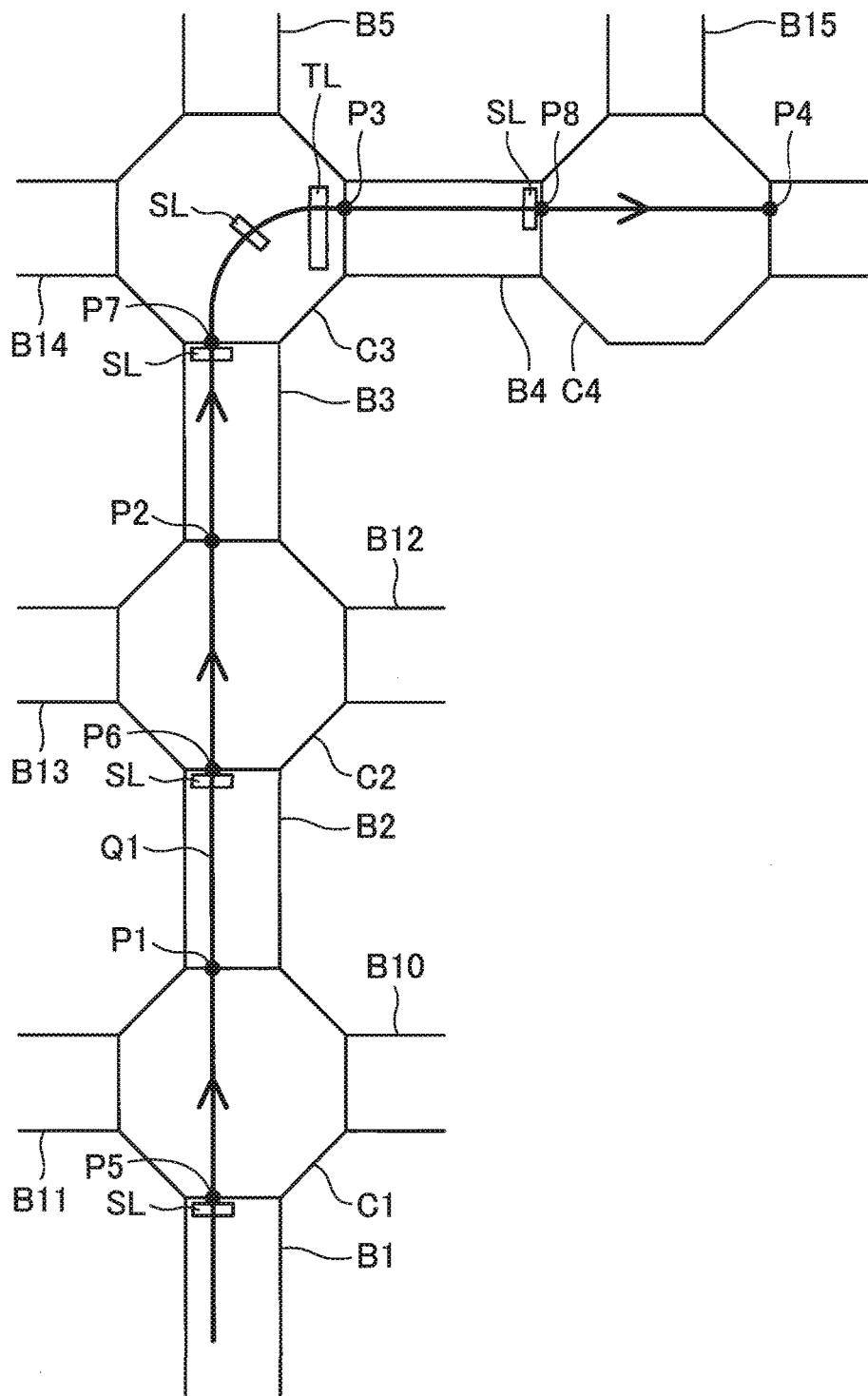
FIG. 7 is a diagram illustrating one example of polygon data stored in road shape data according to a second embodiment.

FIG. 7 is a diagram illustrating an example of polygon data PDa stored in the road shape data 44 according to a second embodiment. The difference between the second embodiment and the first embodiment is the data structure of the polygon data PDa. Otherwise the configuration of the second embodiment is similar to that of the first embodiment, so that like components are expressed by the like signs and are not specifically described. In the polygon data PDa of the second embodiment, each of intersection areas C1 to C4 and road areas B1 to B5 and B10 to B15 connecting with the intersection areas C1 to 4 is set as one reference area D. The intersection C3 includes stop areas. The polygon data PDa also includes data representing boundary lines P1 to P8 (boundary data P) that show the boundaries of adjacent reference areas D. FIG. 7 illustrates the boundary lines P1 to P8 as an example of boundary lines. According to the second embodiment, probe information A1 is generated by the information generation device 20 with regard to each of the reference areas C1 to C4, B1 to B5 and B10 to B15, like the first embodiment. Accordingly the server 60 individually receives the probe information A1 with regard to each of the intersection areas C1 to C4 as the reference areas and with regard to each of the road areas B1 to B5 and B10 to B15 as the reference areas.

As described above, the smaller division than that of the first embodiment is employed as the generation unit of the probe information A1. This configuration enables the statistical information 67 including the travel time statistical information Gp to be generated with high accuracy, based on the collected probe information and thereby enables the travel time from a place of departure to a destination to be calculated with high accuracy. Especially when the destination is located in the middle of the road area B, the configuration of setting the intersection area C and the road area B as different reference areas D enables the travel time from the place of departure to the destination to be calculated with high accuracy.

C. Third Embodiment

Figure 8:
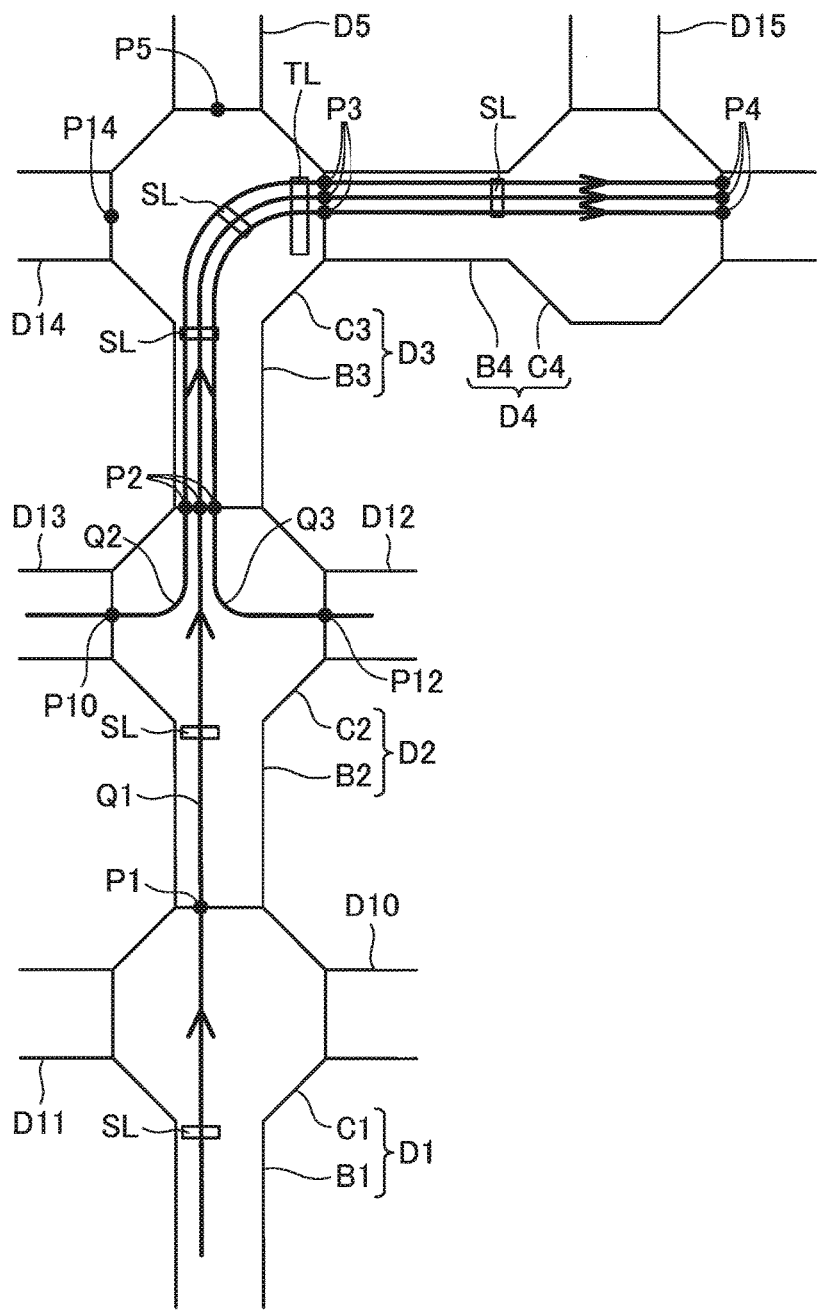
FIG. 8 is a diagram illustrating a third embodiment.

FIG. 8 is a diagram illustrating a third embodiment. The difference between the first embodiment and the third embodiment is the structure of section information Gi (shown in FIGS. 5 and 6). Otherwise the configuration of the third embodiment is similar to that of the first embodiment, so that like components are expressed by the like signs and are not specifically described. FIG. 8 shows one example of polygon data PD stored in the road shape data 44 and is identical with FIG. 4. According to this embodiment, probe information A1b including travel time information on a target ID is generated with regard to each approach direction to the target ID and each exit direction from the target ID. For example, it is assumed that the probe vehicle 10 running through a reference area D3 enters the reference area D3 from different reference areas D2, D12 and D13. Arrows Q1, Q2 and Q3 represent the running paths of the probe vehicle 10 with regard to the respective approaches to the reference area D3. In all the running paths Q1, Q2 and Q3, the exit direction from the reference area D3 is identical, i.e., the reference area D4. The reference area D indicating the approach direction is specified by two boundary data P. For example, when the probe vehicle 10 passes through boundary data P10 and P2, the reference area D13 is specified as the approach ID.

FIG. 9 is a diagram showing the data structure of the probe information A1b generated by the information generation device 20. The uppermost fields in the drawing show the data type of the probe information A1b, and the lower fields in the drawing show concrete examples of the probe information A1b. The probe information A1b of the third embodiment differs from the probe information A1 of the first embodiment (shown in FIG. 5) by only section information Gib. The following describes the details of the section information Gib. The section information Gib includes a target ID used to identify the reference area D in which the probe vehicle 10 runs, an approach ID used to identify from the reference area D from which the probe vehicle 10 enters the reference area D expressed by the target ID, and an exit ID used to identify the reference area D to which the probe vehicle 10 exits from the reference area D expressed by the target ID. The approach ID is specified by two boundary data P. The two boundary data P consist of a first approach point and a second approach point of the boundary data P. In the probe information A1b having a header F1b, the first approach point is P10 and the second approach point is P2, so that the reference area D13 is specified as the approach ID. The probe information A1b having the header F1b is data generated by the probe vehicle 10 (having a vehicle ID of G2) that draws the running path Q2 shown in FIG. 8. The probe information A1b having a header F2b is data generated by the probe vehicle 10 (having a vehicle ID of G3) that draws the running path Q1 shown in FIG. 8. The probe information A1b having a header F3b is data generated by the probe vehicle 10 (having a vehicle ID of G4) that draws the running path Q3 shown in FIG. 8.

FIG. 10 is a diagram showing the data structure of statistical information 67b generated by the server 60 according to the third embodiment. The difference between the statistical information 67b of the third embodiment and the statistical information 67 of the first embodiment (shown in FIG. 6) is the details of the section information Gib. Otherwise the data structure is identical with that of the statistical information 67 of the first embodiment, so that like components are expressed by like signs and are not specifically described. The section information Gib has the similar data structure to that of the probe information A1b (shown in FIG. 9) and includes an approach ID, a target ID and an exit ID. The statistical information 67b is data generated by extraction from multiple pieces of the probe information A1b that are collected from the information generation devices 20, with regard to each piece of information that matches the advance ID, the target ID and the exits ID.

As described above, the third embodiment has similar advantageous effects to those of the first embodiment. For example, the section information Gib includes the approach ID and the exit ID, in addition to the target ID. The travel time in the target ID can thus be generated with regard to each approach ID and each exit ID. This configuration enables data indicating the travel time of the target ID (for example, average cost) to be generated with the higher accuracy.

D. Fourth Embodiment

A fourth embodiment shows another embodiment of the method of determining the target ID used in the probe information A1 or A1b and the statistical information 67 or 67b of the first to the third embodiments described above. In the first to the third embodiments described above, the target ID is specified by one reference area D of the polygon data PD or PDa. This is, however, not restrictive, and the target ID may be specified by a plurality of reference areas D.

Figure 11:
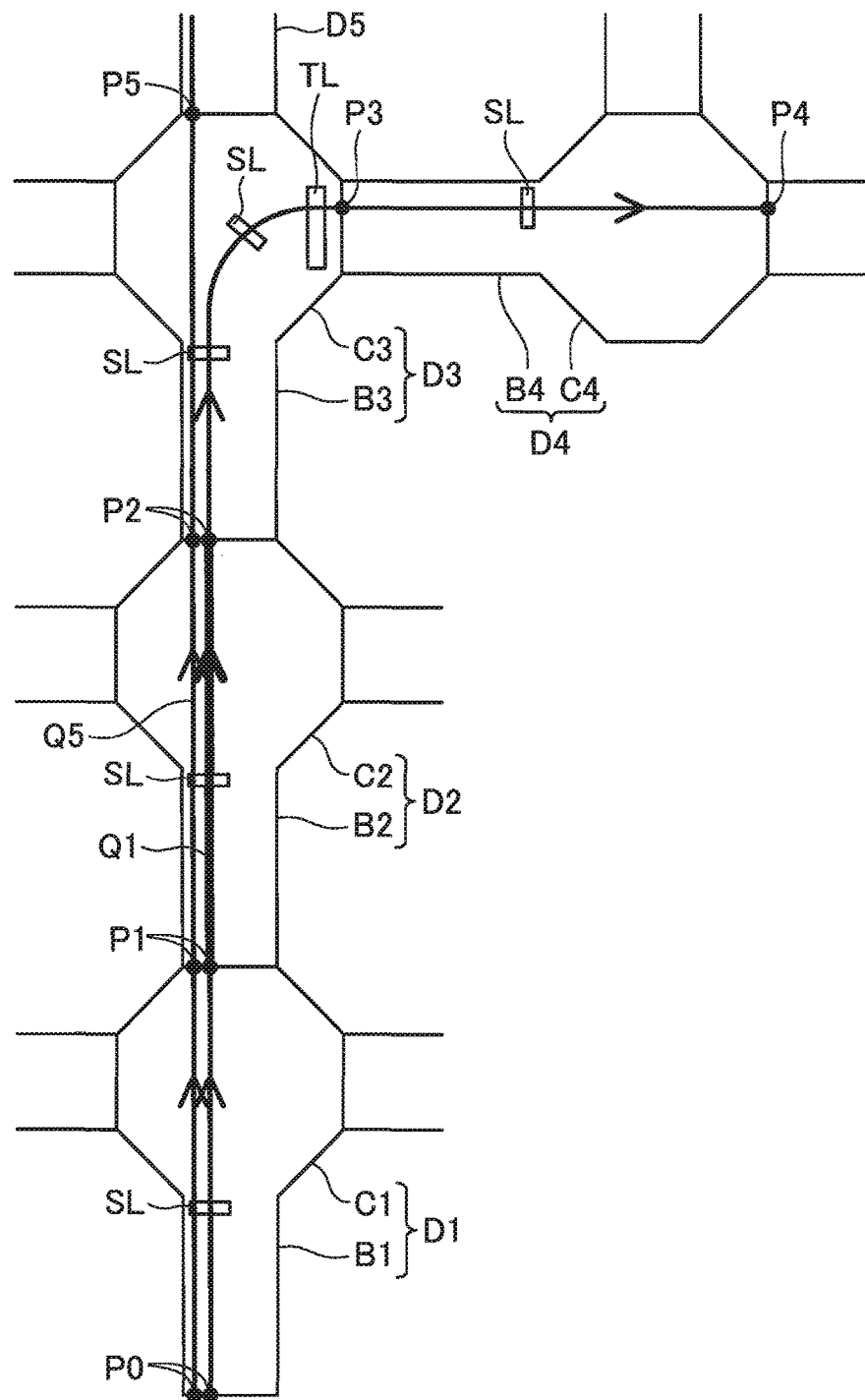
FIG. 11 is a diagram illustrating a fourth embodiment.

FIG. 11 is a diagram illustrating the fourth embodiment. Polygon data PD shown in FIG. 11 is identical with the polygon data PD used in the first or the third embodiment.

Figures 12, 13:
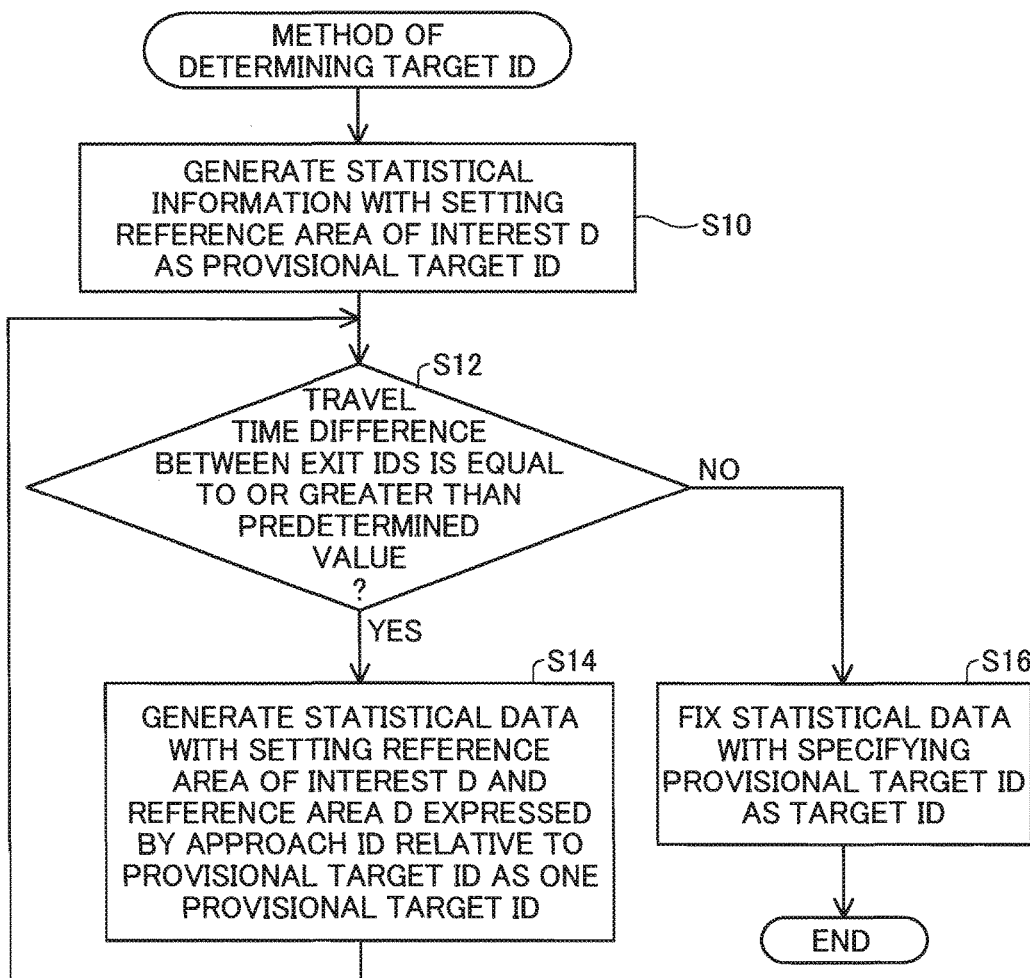
FIG. 12 is a diagram showing the data structure of probe information according to the fourth embodiment.
FIG. 13 is a chart showing a method of generating statistical information according to the fourth embodiment.

Signs irrelevant to the description are omitted from the polygon data PD shown in FIG. 11. FIG. 12 is a diagram showing the data structure of the probe information A1*b* according to the fourth embodiment. The probe information A1*b* of the fourth embodiment has the similar data structure to that of the probe information A1*b* of the third embodiment. FIG. 12 shows probe information A1*b* with regard to running paths Q1 and Q5 shown in FIG. 11 when a reference area D3 is the target ID. More specifically, the probe information A1*b* that is generated by the information generation device 20 mounted on the probe vehicle 10 (having a vehicle ID of G1*c*) drawing the running path Q1 with setting the reference area D3 as the target ID is data having a header F1*c*. The probe information A1*b* that is generated by the information generation device 20 mounted on the probe vehicle 10 (having a vehicle ID of G2*c*) drawing the running path Q5 with setting the reference area D3 as the target ID is data having a header F2*c*.

When statistical information 67*b* is generated with setting a certain reference area D as the target ID, the statistical information 67*b* is likely to have variability according to the traffic conditions in reference areas D expressed by the approach ID and the exit ID relative to the target ID. For example, when probe information A1*b* is generated with setting a reference area D2 immediately before the reference area D3 as the target ID, there may be a significant difference in travel time of the reference area D2 between the probe vehicle 10 drawing the running path Q5 that runs through the reference area D2 and goes straight through the reference area D3 and the probe vehicle 10 drawing the running path Q1 that runs through the reference area D2, turns right in the reference area D3 and goes to the reference area D4. For example, when there is a traffic congestion for the right turn in the reference area D3, the probe vehicle 10 that runs through the reference area D2 and is planned to turn right in the reference area D3 is affected by this traffic congestion for the right turn. The probe vehicle 10 that runs through the reference area D2 and is planned to go straight through the reference area D3 is, on the other hand, not affected by this traffic congestion for the right turn. In order to generate the probe information A1*b* that accurately indicates the travel time in the reference area D, the server 60 determines the range of the reference area D by the following procedure. In the case where the statistical information 67*b* (shown in FIG. 10) is generated based on the probe information A1*b* with regard to each approach ID and each exit ID with setting one reference area D as the target ID, the statistical information 67*b* can be finely classified by the section information Gib. In this case, on the other hand, there may be an insufficient number of pieces of the probe information A1*b* used to accurately generate the statistical information 67*b* with regard to each section information Gib. The following describes a method of generating statistical information with a view to solving this problem. In the description below, it is assumed that a predetermined number of pieces of probe information A1*b* required for analysis with regard to one reference area D set as the target ID are stored in the probe information storage part 62 of the server 60.

Figure 14:
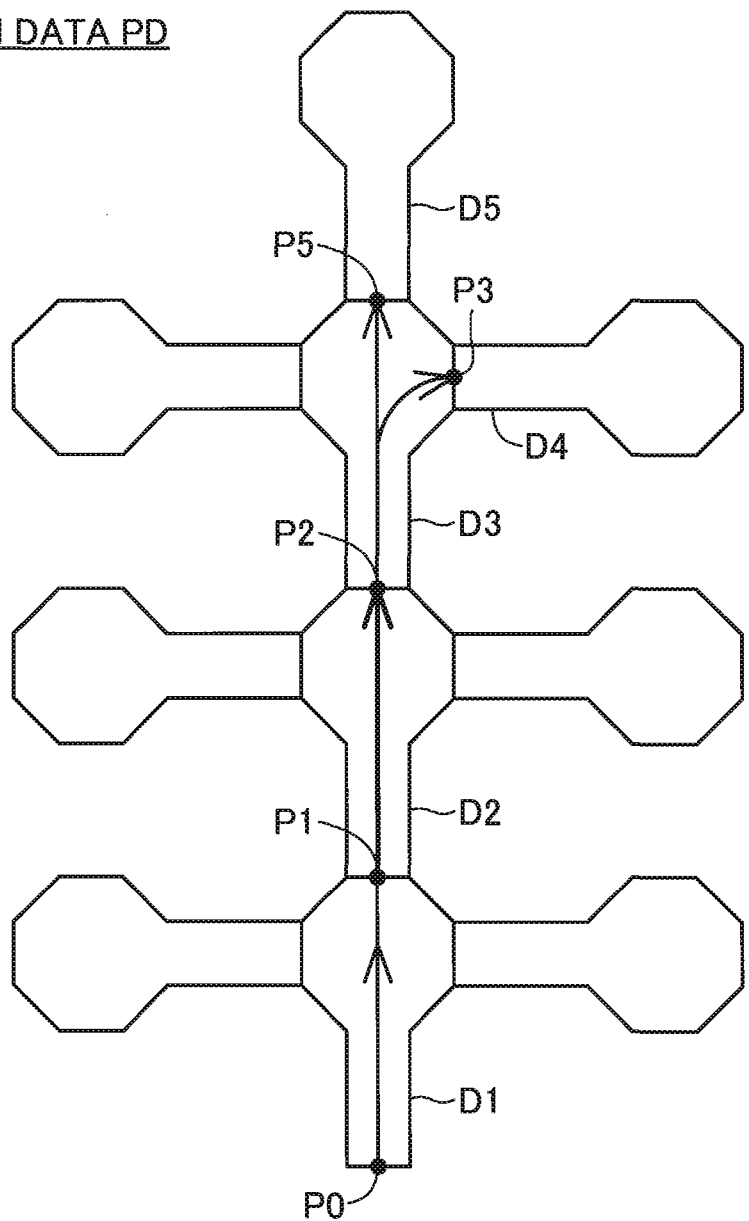
FIG. 14 is a diagram illustrating the method of generating the statistical information according to the fourth embodiment.

FIG. 13 is a chart showing a method of generating statistical information according to the fourth embodiment. FIG. 14 is a diagram illustrating the method of generating the statistical information according to the fourth embodiment. The method of generating the statistical information according to the fourth embodiment is performed by the information analyzer 69 of the server 60 (shown in FIG. 1). The information analyzer 69 first notes one reference area D and generates statistical information 67*b* including travel time statistical information Gp with regard to each section information Gib with setting the noted reference area D (reference area of interest D) as a provisional target ID (step S10). In the illustrated example of FIG. 14, the information analyzer 69 generates the statistical information 67*b* with setting the reference area D3 as the provisional target ID. The information analyzer 69 subsequently compares the respective pieces of travel time statistical information Gp of statistical information 67*b* having an identical provisional target ID and an identical approach ID relative to the provisional target ID but different exits IDs relative to the provisional target ID in the section information Gib and determines whether their travel time difference is equal to or greater than a predetermined value (step S12). The predetermined value may be set to a criterion value to determine whether the exit direction provides a significant difference in travel time of an identical target ID by the effect of traffic conditions, for example, a traffic congestion. According to this embodiment, the average costs of the travel time statistical information Gp are subjected to the comparison for calculating the travel time difference. When it is determined that the travel time difference is equal to or greater than the predetermined value, the information analyzer 69 generates the statistical information 67*b* with setting the reference area of interest D and a reference area D expressed by the approach ID relative to the provisional target ID as one provisional target ID (step S14). In the illustrated example of FIG. 14, the reference area D3 and the reference area D2 are set as a new provisional target ID. In the case where the respective pieces of travel time statistical information Gp included in two pieces of statistical information 67*b* are processed to provide one piece of travel time statistical information Gp, convolution operation of histograms expressed by the respective pieces of travel time statistical information Gp included in the two pieces of statistical information 67*b* generates one piece of travel time statistical information Gp. The processing of step S12 is performed again after step S14, and the processing of step S14 is repeated until the travel time difference becomes less than the predetermined value. When it is determined at step S12 that the travel time difference is less than the predetermined value, the information analyzer 69 fixes the statistical information 67*b* with specifying the provisional target ID as the target ID (step S16). The fixed statistical information 67*b* with regard to the target ID is updated every time a predetermined number of pieces of the probe information A1 are collected from the information generation devices 20 of the probe vehicles 10.

Figure 15:
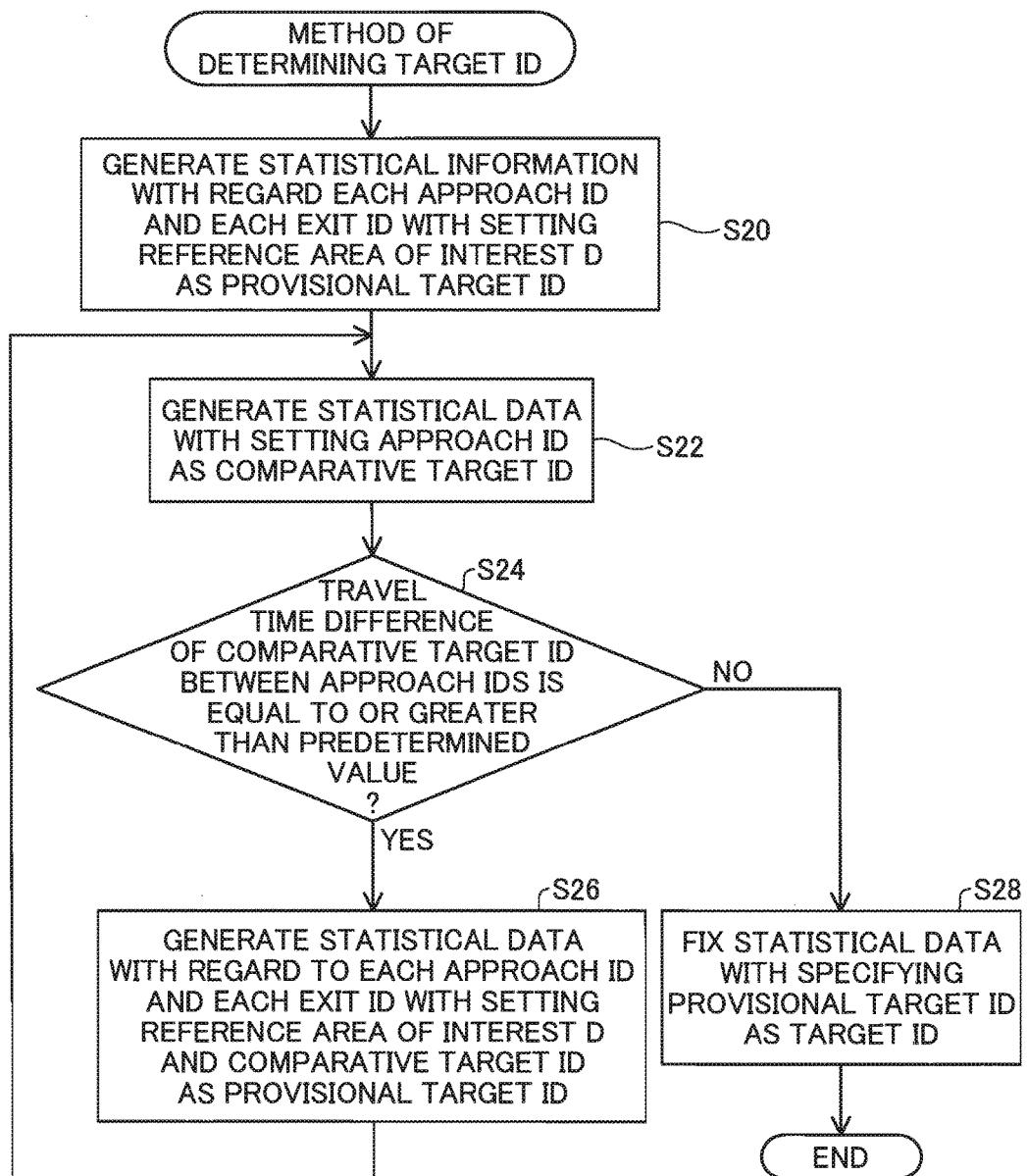
FIG. 15 is a chart showing another method of generating statistical information according to the fourth embodiment.
Figure 16:
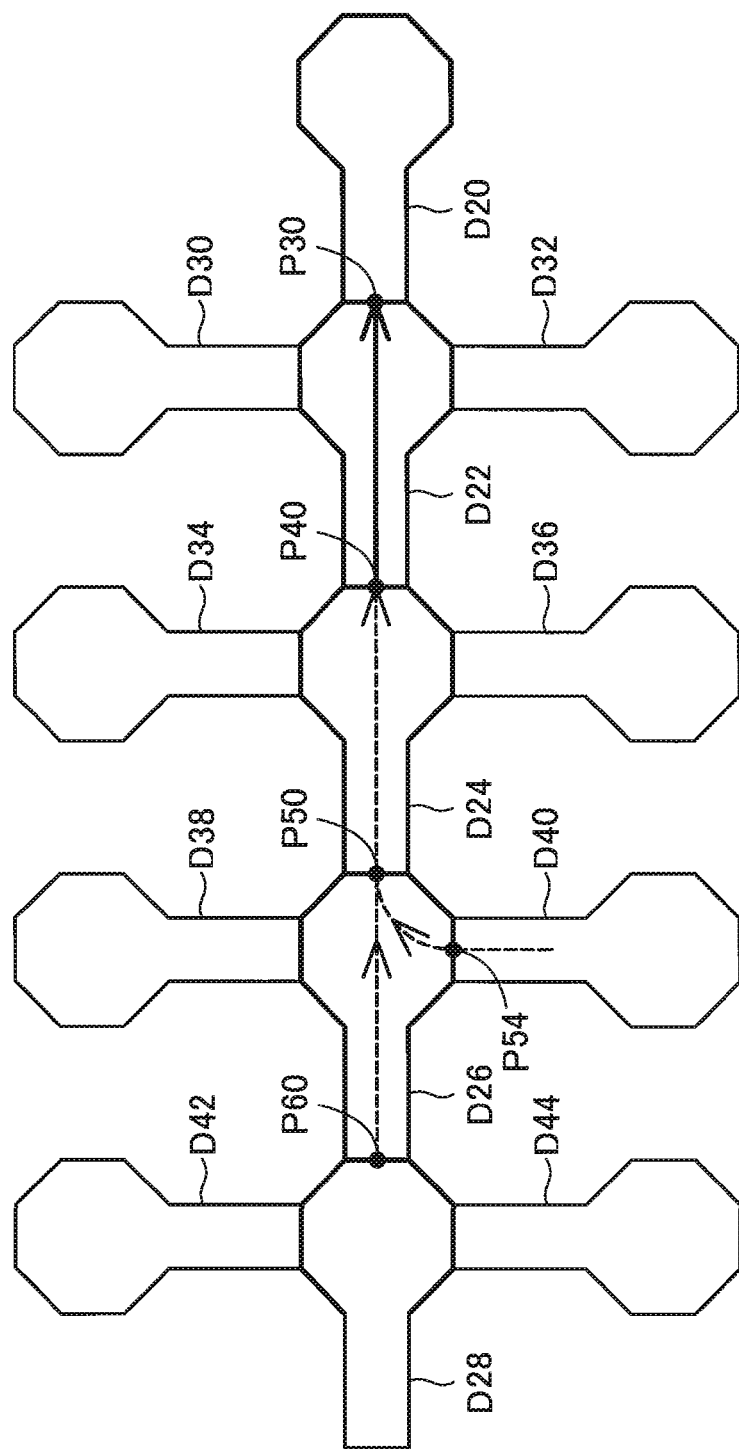
FIG. 16 is a diagram illustrating another method of generating the statistical information.

FIG. 15 is a chart showing another method of generating statistical information according to the fourth embodiment. FIG. 16 is a diagram illustrating another method of generating the statistical information. The method of generating the statistical information shown in FIG. 15 is performed by the information analyzer 69 of the server 60 (shown in FIG. 1). FIG. 16 illustrates polygon data PDd in a partial area of a road network DN. Reference areas D20, D22, D24, D26 and D28 shown in FIG. 16 represent one identical highway, and reference areas D30, D32, D34, D36, D38, D40, D42 and D44 represent different types of roads branching off from the highway.

As shown in FIG. 15, the information analyzer 69 first notes one reference area D and generates statistical information 67*b* including travel time statistical information Gp with regard to each section information Gib with setting the noted reference area D (reference area of interest D) as a provisional target ID (step S20). In the illustrated example of FIG. 16, the information analyzer 69 generates the statistical information 67b with setting the reference area D22 as the provisional target ID. In this case, the approach ID is the reference area D24. The information analyzer 69 subsequently generates statistical information 67b with setting the reference area D24 that is the approach ID as a target ID to be compared (comparative target ID) (step S22). For example, the information analyzer 69 generates the statistical information 67b with setting the reference area D24 shown in FIG. 16 as the comparative target ID. The information analyzer 69 then compares the respective pieces of travel time statistical information Gp of statistical information 67b having an exit ID representing the highway and different approach IDs out of the generated statistical information 67b with regard to the comparative target ID and determines whether their travel time difference is equal to or greater than a predetermined value (step S24). The approach IDs subjected to the comparison at step S24 are an exit ID representing the same highway as the reference areas D expressed by the comparative target ID and the provisional target ID and an approach ID representing a different reference area D from this highway. In the illustrated example of FIG. 16, when the comparative target ID is the reference area D24 and the exit ID is the reference area D22, the approach IDs are the reference area D26 and the reference area D40. The predetermined value may be set to a criterion value to determine whether the approach direction provides a significant difference in travel time of an identical comparative target ID by the effect of traffic conditions, for example, a traffic congestion. According to this embodiment, the average costs of the travel time statistical information Gp are subjected to the comparison for calculating the travel time difference. When it is determined at step S24 that the travel time different is equal to or greater than the predetermined value, the information analyzer 69 generates the statistical information 67b with setting the reference area of interest D and the comparative target ID as one provisional target 1D (step S26). In the illustrated example of FIG. 16, the reference area D22 and the reference area D24 are set as a new provisional target 1D. The processing of step S22 is performed again after step S26, and the processing of step S26 is repeated until the travel time difference becomes less than the predetermined value. When it is determined at step S24 that the travel time difference is less than the predetermined value, the information analyzer 69 fixes the statistical information 67b with specifying the provisional target ID as the target ID (step S28). The fixed statistical information 67b with regard to the target ID is updated every time a predetermined number of pieces of the probe information A1 are collected from the information generation devices 20 of the probe vehicles 10.

As described above, the fourth embodiment generates the statistical information 67b with regard to the target ID by taking into account the traffic conditions in the approach ID and the exit ID relative to the provisional target ID. This configuration enables data on the travel time included in the statistical information 67b to be generated with high accuracy.

E. Fifth Embodiment

A method employed to calculate a travel time in an area set that is collection of a plurality of reference areas D or in a link array that is collection of a plurality of links from travel times of individual reference areas D or individual links may be convolution of data representing the travel times of the respective reference areas D or the reference links (histograms). In some cases, however, the method of calculating the travel time in the area set or the link array by convolution is unlikely to accurately estimate the travel time of the vehicle that actually passes through the area set or the link array. For example, calculation of the travel time by convolution is generally on the premise that the respective travel times of a plurality of reference areas D constituting an area set are not correlated to one another. This method accordingly fails to accurately indicate a change in travel time based on whether the vehicle stops or does not stop at a traffic light or the like placed in a reference area D. Especially in roads under systematic control, the frequency when the vehicle running in a certain area set or in a certain link array stops at the traffic light is not correlated to the number of traffic lights. Accordingly the result of calculation of the travel time by convolution may be different from the actual travel time of the vehicle. Generating statistical information 67, 67b of the area set or the link array based on the probe information A1, A1b sent from the information generation device 20 of the probe vehicle 10 that passes through all the reference areas D constituting the area set or all the links constituting the link array at a time can estimate the travel time more accurately than generating the statistical information 67, 67b by convolution. The number of probe vehicles 10 passing through the area set or the link array at a time is, however, limited. There may be accordingly an insufficient number of pieces of probe information A1, A1b used to generate the statistical information 67, 67b of the area set or the link array. The following describe a technique for solving this problem.

Figure 17:
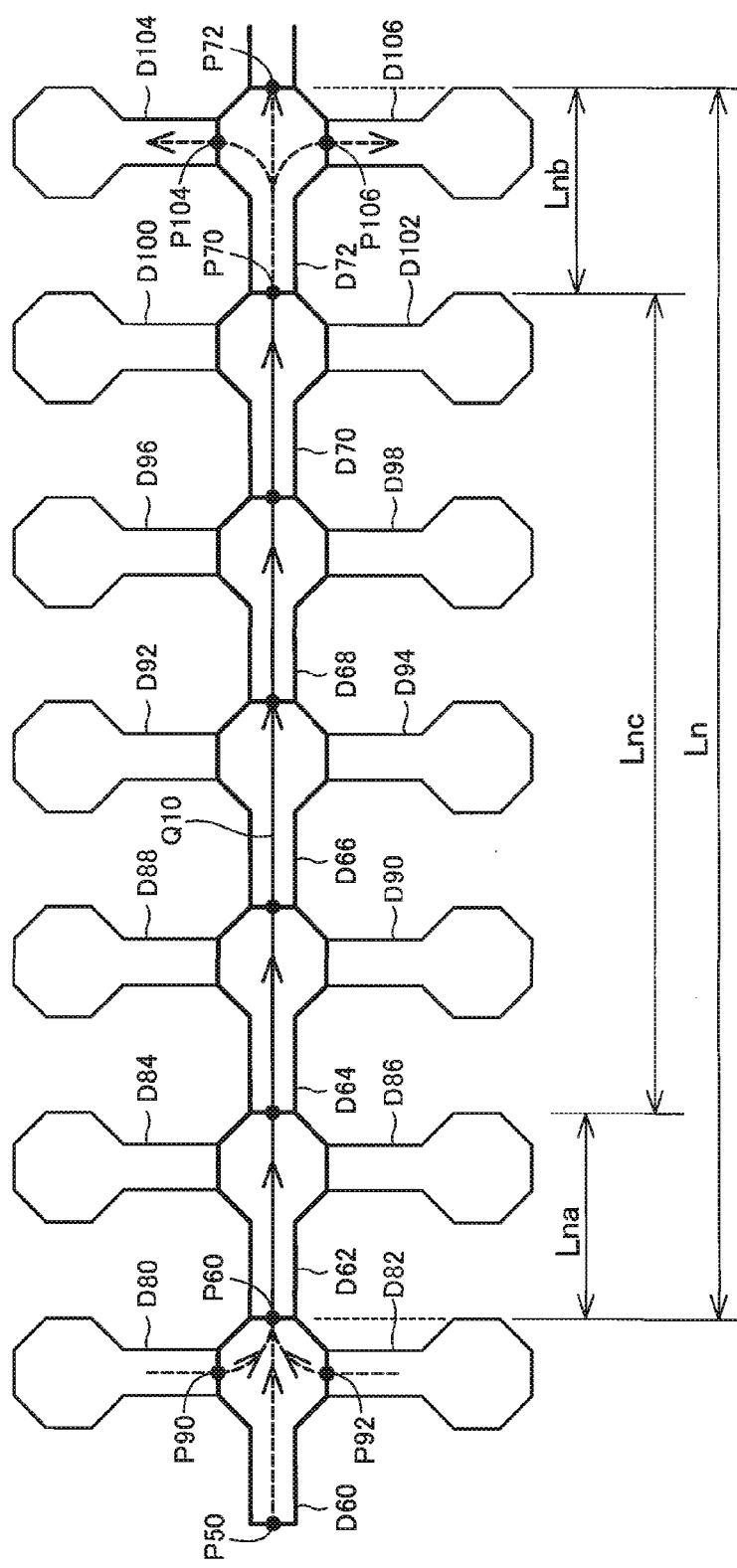
FIG. 17 is a diagram illustrating a fifth embodiment.

FIG. 17 is a diagram illustrating a fifth embodiment. FIG. 17 illustrates polygon data PDe representing a road network DN in a predetermined area. Reference areas D60 to D74 represent one identical main road, and the other reference areas D80 to D106 represent different roads from this main road. Traffic lights placed in the reference areas D60 to D74 are under systematic control. It is assumed that the vehicle passes through the reference areas D60 to D74 from the left side to the right side of the sheet surface as shown by arrows Q10. The following describes a method of generating statistical information 67e of an area set Ln consisting of reference areas D62 to D72 among the reference areas D60 to D74. The statistical information 67e is generated by the information analyzer 69 of the server 60 (shown in FIG. 1), based on the probe information accumulated in the probe information storage part 62.

Figures 18, 19:
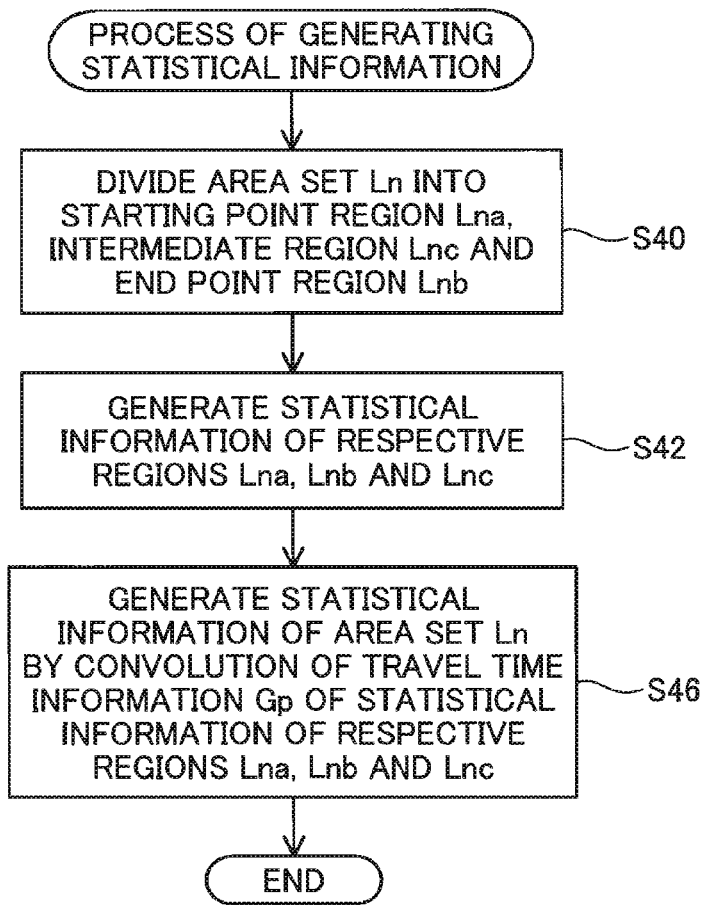
FIG. 18 is a chart showing a method of generating statistical information of an area set.
FIG. 19 is a diagram showing one example of the data structure of probe information of a starting point region.

FIG. 18 is a chart showing a method of generating statistical information of an area set. The information analyzer 69 first divides the area set Ln into three regions as shown in FIG. 17 and generates statistical information with regard to each of the three regions based on probe information (steps S40 and S42). As shown in FIG. 17, the three regions are (i) a starting point region Lna that includes a starting point P60 of the area set Ln and is comprised of at least one reference area D62; (ii) an end point region Lnb that includes an end point P72 of the area set Lna and is comprised of at least one reference area D72; and (iii) an intermediate region Lnc comprised of the reference areas D64 to D70 of the area set Ln. The information analyzer 69 subsequently generates statistical information of the area set Ln by convolution of histogram data of travel time statistical information Gp included in statistical information of the respective regions Lna to Lnc (step S46). The following describes concrete examples of the respective process.

FIG. 19 is a diagram showing one example of the data structure of probe information A1b of the starting point region Lna. The information analyzer 69 collects probe information A1b of the vehicle that runs through the entire starting point region Lna at a time out of the probe information A1b accumulated in the probe information storage part 62, and generates statistical information 67b of the starting point region Lna. More specifically, the information analyzer 69 collects probe information A1b with regard to each approach ID when the exit ID is a reference area D included in the area set Ln and the target ID is the starting point region Lna, and generates statistical information 67b with regard to each approach ID of such collection. In the illustrated example of FIG. 19, probe information A1b having a header F10 is data obtained when the probe vehicle 10 turns left in the reference area D80 and runs through the reference area D62 that is the starting point region Lna. Probe information A1b having a header F11 is data obtained when the probe vehicle 10 goes straight through the reference area D60 and runs through the reference area D62. Probe information A1b having a header F12 is data obtained when the probe vehicle 10 turns right in the reference area D82 and runs through the reference area D62.

FIG. 20 is a diagram showing the data structure of probe information A1b of the intermediate region Lnc and section information Gib included in statistical information. The information analyzer 69 collects probe information A1b of the vehicle that runs through the entire intermediate region Lnc at a time, and generates statistical information 67b of the intermediate region Lnc. More specifically, the information analyzer 69 collects multiple pieces of probe information A1b indicating that the vehicle runs through the entire intermediate region Lnc at a time, and generates statistical information 67b. In the illustrated example of FIG. 20, multiple pieces of probe information A1b having an identical vehicle ID "G11" and indicating that the vehicle runs through the entire intermediate region Lnc at a time are collected, based on the travel time and the approach time included in the respective pieces of the probe information A1b. In FIG. 20, a set of pieces of probe information A1b having headers F21 to F24 is data indicating that the vehicle runs (goes straight) through the entire intermediate region Lnc. Collecting a plurality of sets of the probe information A1b indicating that the vehicle runs through the entire intermediate region Lnc results in generating statistical information 67e including section information Gib shown in the lower table of FIG. 20. The travel time of the intermediate region Lnc expressed by the probe information A1b shown in the upper table of FIG. 20 is 33 minutes that is the total of the travel time of the respective pieces of the probe information A1b.

FIG. 21 is a diagram showing one example of the data structure of probe information A1b of the end point region Lnb. The information analyzer 69 collects probe information A1b of the vehicle that runs through the entire end point region Lnb at a time out of the probe information A1b accumulated in the probe information storage part 62, and generates statistical information 67b of the end point region Lnb. More specifically, the information analyzer 69 collects probe information A1b with regard to each exit ID when the approach ID is a reference area D included in the area set Ln and the target ID is the end point region Lnb, and generates statistical information 67b with regard to each exit ID of such collection. In the illustrated example of FIG. 21, probe information A1b having a header F30 is data obtained when the probe vehicle 10 runs through the end point region Lnb, subsequently turns left in the reference area D72 and goes through the reference area D104. Probe information A1b having a header F31 is data obtained when the probe vehicle 10 runs through the end point region Lnb, subsequently goes straight through the reference area D72 and goes through the reference area D74. Probe information A1b having a header F32 is data obtained when the probe vehicle 10 runs through the end point region Lhb, subsequently turns right in the reference area D72 and goes through the reference area D106.

FIG. 22 is a diagram showing the data structure of statistical information 67f generated at step S46 shown in FIG. 18. The difference between the statistical information 67f of the fifth embodiment and the statistical information 67b of the third embodiment (shown in FIG. 10) is the content of the target ID included in the section information Gif. Otherwise the data structure is identical with that of the statistical information 67b of the third embodiment, so that like components are expressed by like signs and are not specifically described. The target ID of the section information Gif is unique data indicating a plurality of reference areas D62 to D70.

As described above, the fifth embodiment divides the area set Ln into the plurality of regions Lna to Lnc and generates statistical information with regard to each of the plurality of divisional regions Lna to Lnc. Statistical information 67f of the area set Ln consisting of a plurality of reference areas D is generated by convolution of data indicating the travel times of the respective pieces of generated statistical information. Even when there is only a small number of probe vehicles 10 running through all the plurality of reference areas D constituting the area set Ln at a time, this configuration enables the statistical information 67f of the area set Ln to be generated with high accuracy.

F. Modifications

F-1. First Modification

In the embodiments described above, the reference areas D are defined by the polygon data PD–PDe. The method of defining the reference area D is, however, not limited to this method. For example, the reference area D may be defined by the latitude and the longitude of map data that represents a road network two-dimensionally.

F-2. Second Modification

Figure 23:
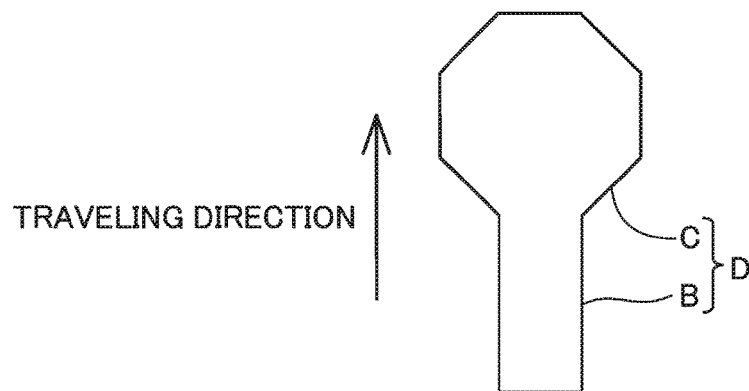
FIG. 23 is a diagram illustrating one example of reference area in polygon data with regard to each traveling direction of a probe vehicle.
Figure 24:
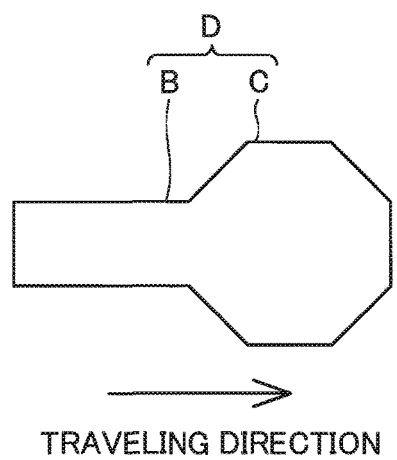
FIG. 24 is a diagram illustrating one example of reference area in polygon data with regard to each traveling direction of the probe vehicle.
Figure 25:
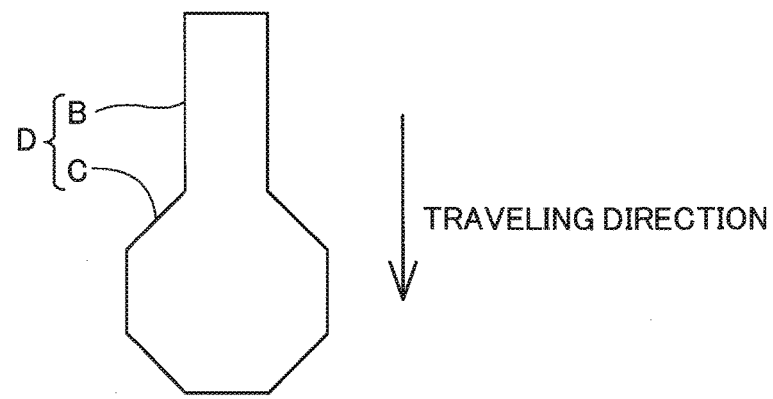
FIG. 25 is a diagram illustrating one example of reference area in polygon data with regard to each traveling direction of the probe vehicle.
Figure 26:
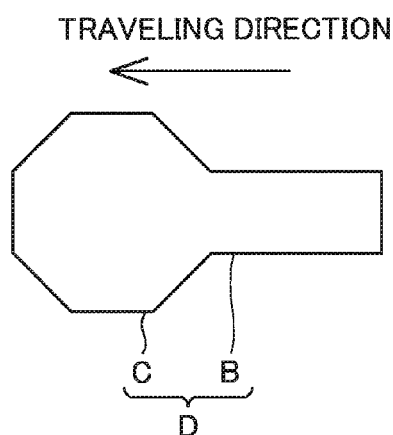
FIG. 26 is a diagram illustrating one example of reference area in polygon data with regard to each traveling direction of the probe vehicle.

The reference area D including the road area B and the intersection area C (shown in FIG. 4) may be specified by a different combination of the road area B and the intersection area C with regard to each traveling direction of the probe vehicle 10. FIGS. 23 to 26 are diagrams illustrating examples of the reference area D in polygon data with regard to each traveling direction of the probe vehicle 10. FIG. 23 illustrates a reference area D used when the probe vehicle 10 runs upward on the sheet surface. FIG. 24 illustrates a reference area D used when the probe vehicle 10 runs rightward on the sheet surface. FIG. 25 illustrates a reference area D used when the probe vehicle 10 runs downward on the sheet surface. FIG. 26 illustrates a reference area D used when the probe vehicle 10 runs leftward on the sheet surface. In summary, when the reference area D consists of the road area B and the intersection area C, the reference area D is provided by specifying the back side in the traveling direction as the road area B and the front side in the traveling direction as the intersection area C.

F-3. Third Modification

Part of the functions implemented by the software configuration in the above embodiments may be implemented by a hardware configuration, and part of the functions implemented by the hardware configuration may be implemented by a software configuration.

G. Sixth Embodiment

Figure 27:
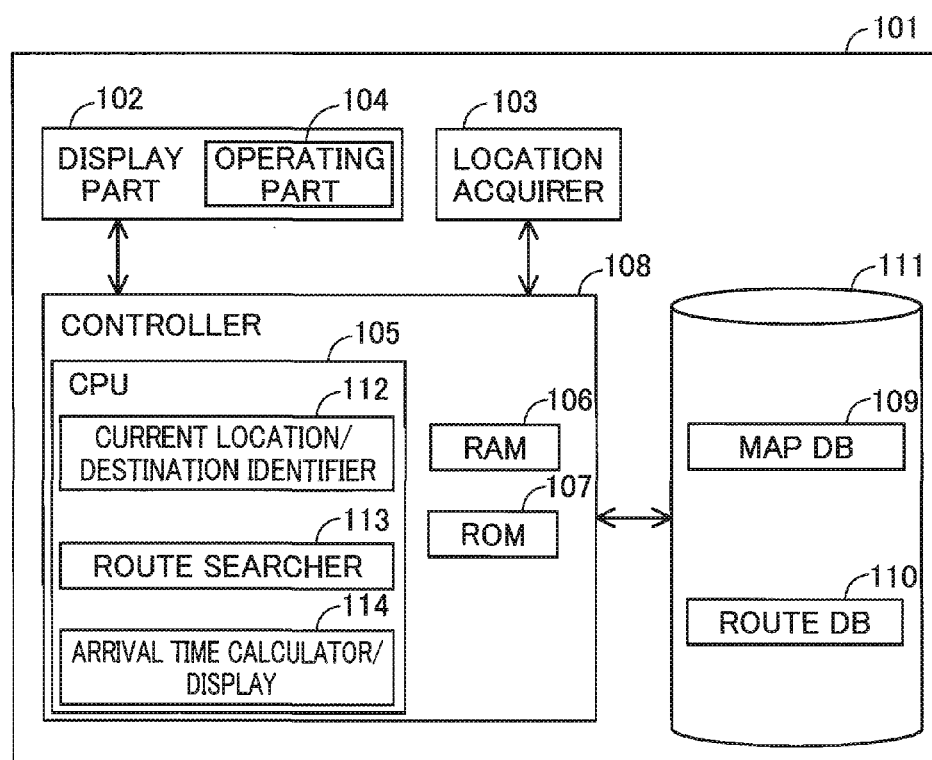
FIG. 27 is a diagram illustrating the schematic configuration of a route search apparatus using map information data as a type of traffic information data according to a sixth embodiment.

FIG. 27 is a diagram illustrating the schematic configuration of a route search apparatus 101 using map information data as a type of traffic information data according to a sixth embodiment. The route search apparatus 101 includes a display part 102 configured to display map images and the like, a current location acquirer 103 configured to receive signals from a GPS or the like and calculate the current location, an operating part 104 configured to allow an operator of the route search apparatus 101 to perform desired operations, a controller 108 including a CPU 105, a RAM 106 and a ROM 107, and a storage device 111 including map database (DB) 109 and route database (DB) 110.

The operating part 104 includes a pressure-sensitive touch panel placed on the surface of the display part 102 and allows the operator to input a desired instruction and the operator's request into the route search apparatus 101 by placing a finger at a position on the map or on a button displayed on the display part 102.

The controller 108 controls the entire route search apparatus 101 in response to the operator's request via the operating part 104. The CPU 105 loads and executes a program stored in the ROM 107, on the RAM 106, so as to serve as a current location/destination identifier 112, a processor (route searcher) 113 and a calculator (arrival time calculator/display) 114 and perform various processes described later. The program may be transferred from storage in a computer readable storage medium to the RAM 106 (or the ROM 107 configured by flash ROM) or may be downloaded from storage in a server or the like via a communication network. The storage device 111 and the calculator 114 constitute a travel time operation device.

The map DB 109 stores information required for display maps, such as passage information and background information of the entire country, Japan. The route DB 110 stores, for example, information regarding nodes representing intersections of passages and the like and information regarding links representing passages interconnecting the nodes.

With reference to FIG. 28, the following describes the data structure of map information data used to calculate a route from a place of departure to a destination and traffic information such as travel time as the results of a route search process and/or a travel time calculation process performed by the route search apparatus 101 as described later.

FIG. 28 is a diagram illustrating a relationship between a plurality of intersection areas (for example, a) and road areas (for example, link a to link g) interconnecting the intersection areas, which constitute a traffic network corresponding to roads on which the vehicle travels.

FIGS. 29 and 30 are diagrams showing the data structure of map information data that stores information regarding a plurality of intersection areas and a plurality of road areas interconnecting the intersection areas, which constitute a traffic network used in a route search process and/or a travel time calculation process performed by the route search apparatus 101 as described later. FIG. 29 is a diagram showing information regarding a road passing cost required for passing through each of the plurality of road areas with regard to each approach direction to the road area and each exit direction from the road area. FIG. 29 shows information with regard to the link d that is a road area. The other links are similarly provided with information on the road passing cost. The road area herein denotes an area from an exit of an intersection to an approach of an adjacent intersection in the exit direction). FIG. 30 is a diagram showing information regarding an intersection passing cost required for passing through each of the plurality of intersection areas with regard to each exit direction from the intersection area. FIG. 30 shows information with regard to the intersection α. The other intersections are similarly provided with information on the intersection passing cost. The intersection area herein denotes an area from an approach to an intersection to an exit from the intersection. The information regarding the road areas and the intersection areas shown in FIGS. 29 and 30 is part of the route DB 110. The road passing cost denotes information on the travel time in a reference area (road area) determined by the method described in the second embodiment. The intersection passing cost denotes information on the travel time in a reference area (intersection area) determined by the method described in the second embodiment.

The link d as a road area is provided with information on nine road passing costs with regard to respective approach directions to the link d and respective exit directions from the link d. For example, in FIG. 29, setting the link d to a target link ID indicates that the information regards the road passing cost of the link d. Setting the link e to an approach link ID indicates that the information regards approach from the link e to the target link d. Setting the link a to an exit link ID indicates that the information regards exit from the target link d to the link a.

The intersection α as an intersection area is provided with information on three intersection passing costs with regard to respective exit directions from the intersection α. For example, in FIG. 30, setting the intersection α to a target intersection ID indicates that the information regards the intersection passing cost of the intersection α. Setting the link d to an approach link ID indicates that the information regards approach from the link d to the intersection α. Setting the link a to an exit link ID indicates that the information regards exit from the intersection α to the link a.

With reference to FIG. 31, the following describes application of the map information data described above to a process of route search and calculation of a travel time to a destination. The processing described below is performed by the CPU 105. The processing of FIG. 31 is triggered by an operator's instruction given to the route search apparatus 101 to start a route search.

On the start of processing shown in FIG. 31, the CPU 105 first searches and identifies a node corresponding to a current location from information regarding the nodes stored in the route DB 110, based on a signal from a GPS or the like input by the location acquirer 103 (step S110). The CPU 105 subsequently searches and identifies a node corresponding to a destination from the information regarding the nodes stored in the route DB 110, based on the destination entered by the operator (step S120). This series of processes corresponds to the process of identifying the current location and the destination by the current location/destination identifier 112.

The CPU 105 subsequently performs a route search for a shortest route from the node corresponding to the place of departure identified at step S110 to the node corresponding to the destination identified at step S120 by the known Dijkstra's algorithm or the like, and identifies links and nodes constituting the shortest route (step S130). This process corresponds to the process of searching the route from the place of departure to the destination by the processor 113. Instead of this route search, the operator may select a shortest route on the display part.

The CPU 105 subsequently reads the costs of the respective links and intersections constituting the route identified at step S130 to the RAM 106 (step S140) and sums up the costs of the respective links and intersections to calculate a travel time to the destination (step S150).

The CPU 105 then specifies the travel time calculated at step S150 as a travel time required from the place of departure to the destination and displays an expected arrival time to arrive the destination on the display part. This series of processes corresponds to the process of calculating the travel time from the place of departure to the destination by the calculator 114. This completes the processing shown in FIG. 31.

As described above, according to this embodiment, each intersection area and each road area connecting with the intersection area are respectively provided with the costs with regard to each approach direction and each exit direction. This configuration allows for search for a route having the shortest time to the destination and enables the travel time to the destination to be calculated with high accuracy, compared with a configuration that provides each road area with only one cost irrespective of the approach direction and the exit direction. Additionally, the intersection area and the road area are provided with different costs. This enables the travel time to the destination to be calculated with high accuracy, even when the destination is set between an intersection and another intersection.

The invention is not limited to any of the embodiments and modifications described above but may be implemented by a diversity of other configurations without departing from the scope of the invention. For example, the technical features of any of the embodiments and modifications corresponding to the technical features of each of the aspects described in Summary may be replaced or combined appropriately, in order to solve part or all of the problems described above. Any of the technical features may be omitted appropriately unless the technical feature is described as essential herein.

REFERENCE SIGNS LIST 10, 10a1-10a3 probe vehicles
20 information generation device
22 communicator
26 vehicle speed sensor
28 gyro sensor
29 time sensor
30 controller
31 location identifier
32 probe information generator
40 storage part
42 data accumulator
44 road shape data
46 road network data
60 server
61 statistical information storage part
62 probe information storage part
63 road shape database
68 road network database
67, 67b, 67e, 67f statistical information
69 information analyzer
90 collecting system
D reference area
N1 node
P1 boundary line
C1 intersection area
B1 road area
Q1 running path
L1 link
P2 boundary line
Q2 running path
L3 link
N3 node
F3 packet
Q3 running path
P3 boundary line
Q5 running path
L5 link
PD polygon data
NE wireless communication network
SL stop line
TL pedestrian crossing
DN road network
Gi section information
Ln area set
P60 starting point
P70 end point
PDa polygon data
PDd polygon data
PDe polygon data
Lna starting point region
Lnb end point region
Lnc intermediate region
S1 start point

The invention claimed is:

1. A method of collecting probe information generated during travel of a vehicle, comprising:
(a) receiving probe information including travel time information of a reference area, from a vehicle traveling the reference area, that includes at least one of (1) an intersection area of a plurality of intersection areas that is an area from an approach to an intersection to an exit from the intersection and (2) a road area that connects with at least one of the plurality of intersection areas and is an area from the exit of one intersection to an approach of another intersection adjacent to the one intersection in an exit direction;
(b) storing the received probe information; and
(c) generating statistical information that indicates a histogram of a travel time in the reference area, based on the stored probe information, wherein the (c) includes:
(c1) dividing an area set including at least three reference areas into (i) a starting point region that includes a starting point of the area set and is comprised of at least one reference area; (ii) an end point region that includes an end point of the area set and is comprised of at least one reference area; and (iii) an intermediate region that is included in the area set;
(c2) generating the statistical information of the starting point region, based on the probe information of the starting point region received from a vehicle that passes through the entire reference area constituting the starting point region at a time;
(c3) generating the statistical information of the end point region, based on the probe information of the end point region received from a vehicle that passes through the entire reference area constituting the end point region at a time;
(c4) generating the statistical information of the intermediate region, based on the probe information of the intermediate region received from a vehicle that passes through the entire reference area constituting the intermediate region at a time; and (c5) generating the statistical information of the area set by a convolution operation of pieces of information regarding the travel time that respectively include the statistical information of the starting point region, the statistical information of the intermediate region, and the statistical information of the end point region.

2. The method of collecting according to claim 1, wherein the reference area includes both the intersection area and the road area that connects with the intersection area.

3. The method of collecting according to claim 2, wherein the probe information is generated with regard to each approach direction to the reference area.

4. The method of collecting according to claim 2, wherein the probe information is generated with regard to each exit direction from the reference area.

5. The method of collecting according to claim 1, wherein the (a) separately receives the probe information of the intersection area that is the reference area and the probe information of the road area that is the reference area.

6. The method of collecting according to claim 5, wherein the probe information is generated with regard to each approach direction to the reference area.

7. The method of collecting according to claim 5, wherein the probe information is generated with regard to each exit direction from the reference area.

8. The method of collecting according to claim 1, wherein the probe information is generated with regard to each approach direction to the reference area.

9. The method of collecting according to claim 8, wherein the probe information is generated with regard to each exit direction from the reference area.

10. The method of collecting according to claim 1, wherein the probe information is generated with regard to each exit direction from the reference area.

11. A non-transitory computer readable recording medium in which traffic information data is recorded, wherein the traffic information data stores information regarding a plurality of intersection areas and a plurality of road areas interconnecting the intersection areas, which constitute a traffic network,
the traffic information data comprising:
information regarding an intersection passing cost required for passing through each of the plurality of intersection areas with regard to each exit direction from the intersection area; and
information regarding a road passing cost required for passing through each of the plurality of road areas with regard to each approach direction to the road area and each exit direction from the road area.

12. The non-transitory computer readable recording medium according to claim 11, wherein
the road area is an area from an exit of an intersection to an approach to an adjacent intersection in an exit direction, and
the intersection area is an area from an approach to an intersection to an exit from the intersection.

13. The non-transitory computer readable recording medium according to claim 11, wherein the traffic information data is generated based upon statistical information that indicates a histogram of a travel time through each of the plurality of intersection areas with regard to each exit direction from the intersection area and each of the plurality of road areas with regard to each approach direction to the road area and each exit direction from the road area.

14. The non-transitory computer readable recording medium according to claim 13, wherein the statistical information is generated based upon:
dividing an area set including at least three reference areas into (i) a starting point region that includes a starting point of the area set and is comprised of at least one reference area; (ii) an end point region that includes an end point of the area set and is comprised of at least one reference area; and (iii) an intermediate region that is included in the area set;
generating the statistical information of the starting point region, based on the probe information of the starting point region received from a vehicle that passes through the entire reference area constituting the starting point region at a time;
generating the statistical information of the end point region, based on the probe information of the end point region received from a vehicle that passes through the entire reference area constituting the end point region at a time;
generating the statistical information of the intermediate region, based on the probe information of the intermediate region received from a vehicle that passes through the entire reference area constituting the intermediate region at a time; and
generating the statistical information of the area set by a convolution operation of pieces of information regarding the travel time that respectively include the statistical information of the starting point region, the statistical information of the intermediate region, and the statistical information of the end point region.

15. A travel time calculation apparatus, comprising:
a non-transitory computer readable recording medium in which traffic information data is recorded, wherein the traffic information data stores information regarding a plurality of intersection areas and a plurality of road areas interconnecting the intersection areas, which constitute a traffic network,
wherein the traffic information data comprising:
information regarding an intersection passing cost required for passing through each of the plurality of intersection areas with regard to each exit direction from the intersection area; and
information regarding a road passing cost required for passing through each of the plurality of road areas with regard to each approach direction to the road area and each exit direction from the road area; and
a processor configured to use information regarding the road passing cost of a plurality of the road areas and information regarding the intersection passing cost of a plurality of the intersection areas in a route from a first point to a second point in the traffic network, so as to calculate a travel time from the first point to the second point.

16. The travel time calculation apparatus according to claim 15, wherein the traffic information data is generated based upon statistical information that indicates a histogram of a travel time through each of the plurality of intersection areas with regard to each exit direction from the intersection area and each of the plurality of road areas with regard to each approach direction to the road area and each exit direction from the road area.

17. The travel time calculation apparatus according to claim 16, wherein the statistical information is generated based upon:

dividing an area set including at least three reference areas into (i) a starting point region that includes a starting point of the area set and is comprised of at least one reference area; (ii) an end point region that includes an end point of the area set and is comprised of at least one reference area; and (iii) an intermediate region that is included in the area set;

generating the statistical information of the starting point region, based on the probe information of the starting point region received from a vehicle that passes through the entire reference area constituting the starting point region at a time;

generating the statistical information of the end point region, based on the probe information of the end point region received from a vehicle that passes through the entire reference area constituting the end point region at a time;

generating the statistical information of the intermediate region, based on the probe information of the intermediate region received from a vehicle that passes through the entire reference area constituting the intermediate region at a time; and generating the statistical information of the area set by a convolution operation of pieces of information regarding the travel time that respectively include the statistical information of the starting point region, the statistical information of the intermediate region, and the statistical information of the end point region.

\* \* \* \* \*